United States Patent
Fukata et al.

(10) Patent No.: US 9,832,444 B2
(45) Date of Patent: *Nov. 28, 2017

(54) THREE-DIMENSIONAL OBJECT DETECTION DEVICE

(71) Applicant: Nissan Motor Co., Ltd., Yokohama-shi, Kanagawa (JP)

(72) Inventors: Osamu Fukata, Sagamihara (JP); Yasuhisa Hayakawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 459 days.

This patent is subject to a terminal disclaimer.

(21) Appl. No.: 14/373,054

(22) PCT Filed: Feb. 26, 2013

(86) PCT No.: PCT/JP2013/054855
§ 371 (c)(1),
(2) Date: Jul. 18, 2014

(87) PCT Pub. No.: WO2013/129354
PCT Pub. Date: Sep. 6, 2013

(65) Prior Publication Data
US 2015/0009292 A1    Jan. 8, 2015

(30) Foreign Application Priority Data
Mar. 1, 2012   (JP) .................. 2012-045352

(51) Int. Cl.
*H04N 15/00*    (2006.01)
*H04N 13/02*    (2006.01)
(Continued)

(52) U.S. Cl.
CPC ..... *H04N 13/0011* (2013.01); *G06K 9/00201* (2013.01); *G06K 9/00805* (2013.01);
(Continued)

(58) Field of Classification Search
CPC .................................. G06K 9/00201
(Continued)

(56) References Cited

U.S. PATENT DOCUMENTS 6,411,204 B1 * 6/2002 Bloomfield ............ B60Q 1/302
340/464
2011/0310245 A1 * 12/2011 Tsuchiya ................. G01S 11/12
348/135
2013/0131922 A1 * 5/2013 Ogata .................... B60Q 1/143
701/36

FOREIGN PATENT DOCUMENTS

JP    2008-52320 A    3/2008
JP    2008-219063 A   9/2008
(Continued)

OTHER PUBLICATIONS

Lin et al., "Construction of Fisheye Lens Inverse Perspective Mapping Model and Its Applications of Obstacle Detection", Jun. 2010, Hindawi Publishing Corporation, EURASIP Journal on Advance in Signal Processing.*
(Continued)

*Primary Examiner* — Jeremaiah C Hallenbeck-Huber
*Assistant Examiner* — Amir Shahnami
(74) *Attorney, Agent, or Firm* — Global IP Counselors, LLP

(57) ABSTRACT

A three-dimensional object detection device includes an image capturing unit, an image conversion unit, a three-dimensional object detection unit and a light source detection unit. The image conversion unit converts a viewpoint of the images obtained by the image capturing unit to create bird's-eye view images. The three-dimensional object detection unit detects a presence of a three-dimensional object within the adjacent lane. The three-dimensional object detection unit determines the presence of the three-dimensional object within the adjacent lane-when the difference
(Continued)

waveform information is at a threshold value or higher. The three-dimensional object detection unit set a threshold value lower so that the three-dimensional object is more readily detected in a rearward area than forward area with respect to a line connecting the light source and the image capturing unit.

5 Claims, 27 Drawing Sheets

(51) Int. Cl.
*H04N 13/00* (2006.01)
*G06T 5/00* (2006.01)
*G06K 9/00* (2006.01)
*G06T 7/262* (2017.01)
*H04N 7/18* (2006.01)

(52) U.S. Cl.
CPC .......... *G06K 9/00825* (2013.01); *G06T 5/006* (2013.01); *G06T 7/262* (2017.01); *H04N 13/0207* (2013.01); *G06T 2207/20064* (2013.01); *G06T 2207/30256* (2013.01); *H04N 7/183* (2013.01); *H04N 2013/0074* (2013.01)

(58) Field of Classification Search
USPC .......................................................... 348/46
See application file for complete search history.

(56) References Cited

FOREIGN PATENT DOCUMENTS

| | | |
|---|---|---|
| JP | 2008-227646 A | 9/2008 |
| JP | 2010-262437 A | 11/2010 |
| JP | 2012-3662 A | 1/2012 |
| WO | 2012/014735 A1 | 2/2012 |

OTHER PUBLICATIONS

Chin-Teng Lin et al, "Construction of Fisheye Lens Inverse Perspective Mapping Model and Its Applications of Obstacle Detection," EURASIP Journal on Advances in Signal Processing, Jun. 15, 2010, vol. 1, No. 3, 2010, Hindawi Publishing Corporation, New York, NY.

* cited by examiner

THREE-DIMENSIONAL OBJECT DETECTION DEVICE

CROSS-REFERENCE TO RELATED APPLICATIONS

This application is a U.S. National stage application of International Application No. PCT/JP2013/054855, filed Feb. 26, 2013, which claims priority to Japanese Patent Application No. 2012-045352 filed in Japan on Mar. 1, 2012. The entire disclosure of Japanese Patent Application No. 2012-045352 is hereby incorporated herein by reference.

BACKGROUND

1. Field of the Invention

The present invention relates to a three-dimensional object detection device.

2. Background Information

In a conventionally known technique, two captured images captured at different times are converted to a bird's-eye view image, and an obstacle is detected based on differences in the two converted bird's-eye view images (see Japanese Laid-Open Patent Application No. 2008-227646).

SUMMARY

When another vehicle traveling in an adjacent lane adjacent to the lane in which the host vehicle is traveling is to be detected at nighttime using an image in which the rearward of a host vehicle has been captured, and when light from the headlights of another vehicle traveling in a lane adjacent to the adjacent lane (also be referred to below as adjacent-adjacent lane) is shined into detection areas, there may cases in which an image of the light from the headlights is errantly detected as an adjacent vehicle traveling in an adjacent lane.

The problem to be solved by the present invention is to eliminate the effect of light shined from the headlights of another vehicle traveling in an adjacent-adjacent lane adjacent to the adjacent lane when a three-dimensional object (another vehicle) present in an adjacent lane adjacent to the lane in which the host vehicle is traveling is to be detected.

The present invention solves the problem by detecting a light source present rearward of the host vehicle and reducing the threshold value for detecting another vehicle traveling in an adjacent lane so that a three-dimensional object in an area rearward of a line connecting the detected light source and an image capturing device is more readily detected than in an area forward from the line.

Light shined from the headlights of another vehicle traveling in an adjacent-adjacent lane shines forward from a line connecting the light source thereof and an image capturing device, and the image of three-dimensional object present in an adjacent lane appears rearward from the line connecting the light source and the image capturing device. Therefore, a threshold value for detecting another vehicle traveling in an adjacent lane is set lower so that a three-dimensional object is readily detected rearward from the line connecting the headlights (light source) and the image capturing device, thereby making it possible to suitably detect a three-dimensional object present in an adjacent lane.

BRIEF DESCRIPTION OF THE DRAWINGS

Referring now to the attached drawings which form a part of this original disclosure.

DETAILED DESCRIPTION OF THE EMBODIMENTS

Figure 1:
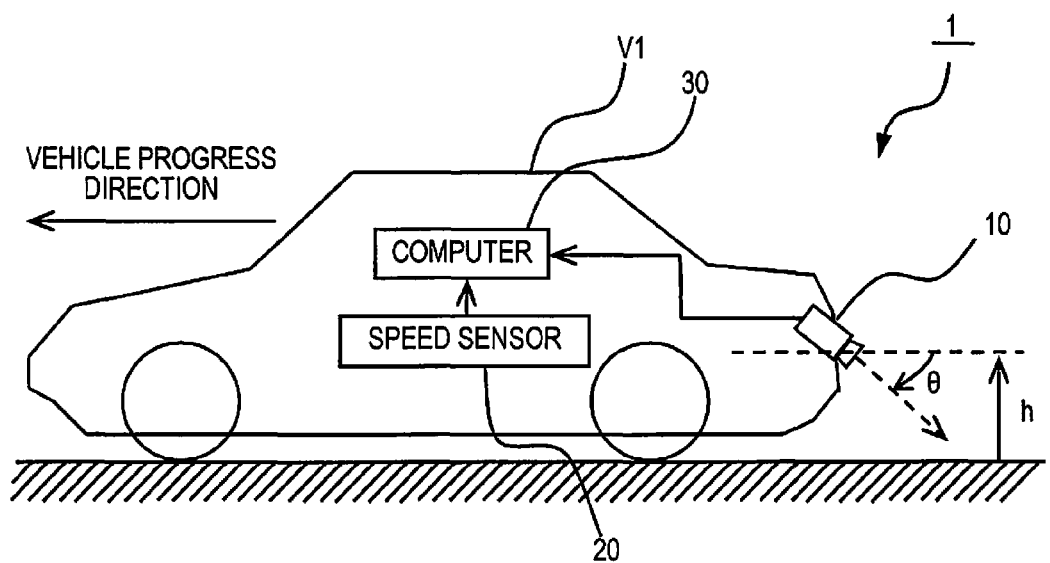
FIG. 1 is a schematic structural diagram of a vehicle in which a three-dimensional object detection device according to the first embodiment has been mounted.

FIG. 1 is a schematic structural diagram of a vehicle in which a three-dimensional object detection device according to the first embodiment has been mounted. An object of the three-dimensional object detection device 1 according to the present embodiment is to detect another vehicle (may hereinbelow be referred to as "adjacent vehicle") present in an adjacent lane where contact is possible should a host vehicle V1 change lanes. The three-dimensional object detection device 1 according to the present embodiment is provided with a camera 10, a speed sensor 20, and a computer 30, as illustrated in FIG. 1.

The camera 10 is attached to the host vehicle V1 so that the optical axis is an angle θ downward from the horizontal in a location at a height h at the rear of the host vehicle V1, as illustrated in FIG. 1. From this position, the camera 10 captures a predetermined area of the surrounding environment of the host vehicle V1. The speed sensor 20 detects the travel speed of the host vehicle V1 and calculates the vehicle speed from a wheel speed detected by, e.g., a wheel speed sensor for detecting the rotational speed of a wheel. The computer 30 detects an adjacent vehicle present in an adjacent lane rearward of the host vehicle.

Figure 2:
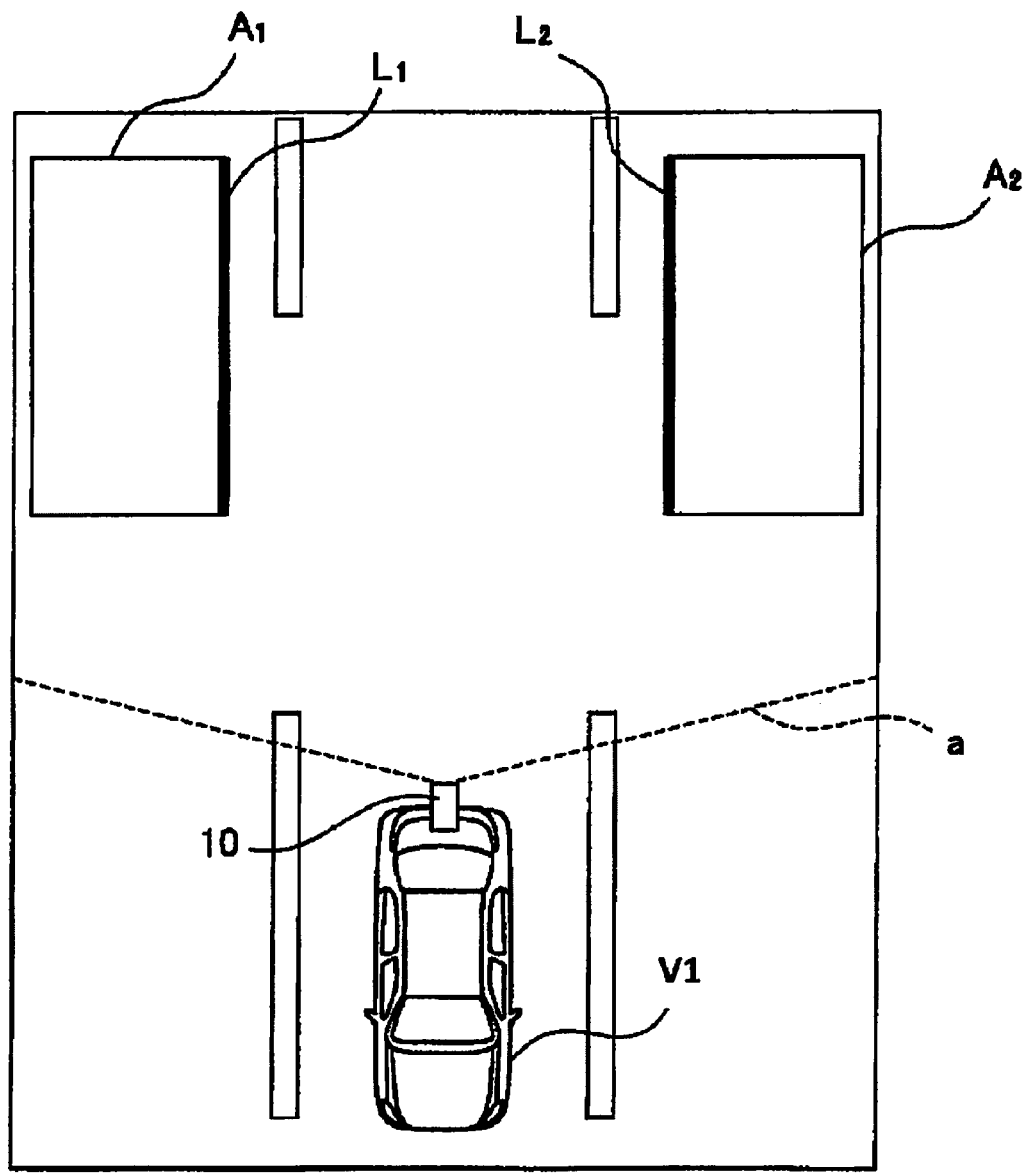
FIG. 2 is a plan view illustrating the traveling state of the vehicle in FIG. 1.

FIG. 2 is a plan view illustrating the traveling state of the host vehicle V1 in FIG. 1. As illustrated in the drawing, the camera 10 captures the rearward side of the vehicle at a predetermined view angle a. At this time, the view angle a of the camera 10 is set to a view angle that allows the left and right lanes (adjacent lanes) to be captured in addition to the lane in which the host vehicle V1 is traveling.

Figure 3:
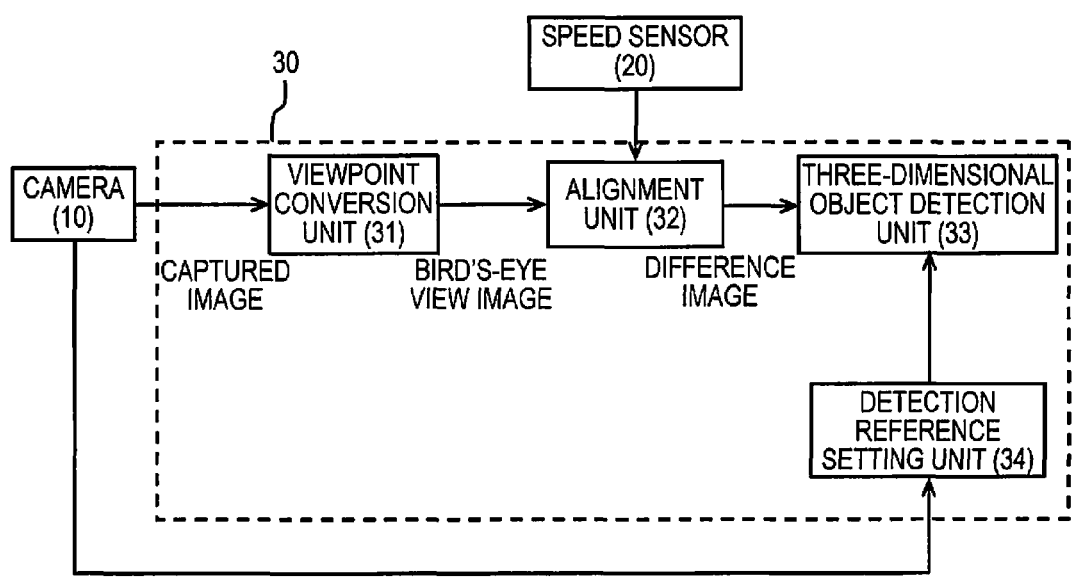
FIG. 3 is a block diagram view illustrating the details of the computer according to the first embodiment.

FIG. 3 is a block view illustrating the details of the computer 30 in FIG. 1. The camera 10 and the speed sensor 20 are also illustrated in FIG. 3 in order to distinctly indicate connection relationships.

As illustrated in FIG. 3, the computer 30 is provided with a viewpoint conversion unit 31, an alignment unit 32, a three-dimensional object detection unit 33, and a detection reference setting unit 34. The configuration of these units is described below.

Captured image data of the predetermined area obtained by capturing carried out by the camera 10 is inputted to the viewpoint conversion unit 31, and the captured image data thus inputted is converted to bird's-eye view image data, which is a bird's-eye view state. A bird's-eye view state is a state of viewing from a viewpoint of an imaginary camera that is looking down from above, e.g., vertically downward. Viewpoint conversion can be carried out in the manner described in, e.g., Japanese Laid-Open Patent Application No. 2008-219063. The reason that captured image data is converted to bird's-eye view image data is based on the principle that perpendicular edges unique to a three-dimensional object are converted to a straight-line group that passes through a specific fixed point by viewpoint conversion to bird's-eye view image data, and utilizing this principle allows a planar object and a three-dimensional object to be differentiated.

Figure 4:
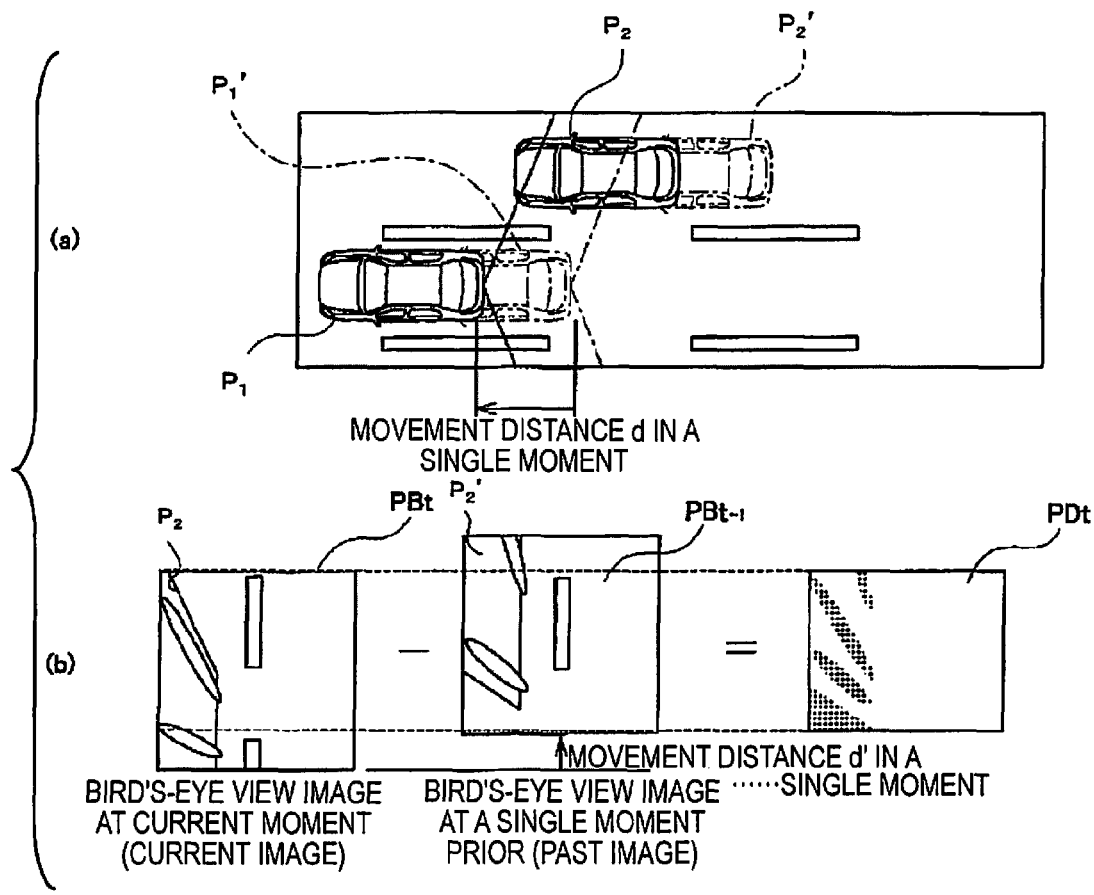
FIG. 4 is a view for describing the general overview of the processing of the alignment unit according to the first embodiment, with part (a) illustrating the movement state of the vehicle from a top plan view, and part (b) illustrating a general overview of alignment.

The bird's-eye view image data obtained by viewpoint conversion carried out by the viewpoint conversion unit 31 is sequentially inputted to the alignment unit 32, and the inputted positions of the bird's-eye view image data at different times are aligned. FIG. 4 is a view for describing the general overview of the processing of the alignment unit 32, with part (a) of FIG. 4 being a plan view illustrating the movement state of the host vehicle V1, and part (b) of FIG. 4 being an image illustrating a general overview of alignment.

As illustrated in part (a) of FIG. 4, the host vehicle V1 at the current moment is positioned at $P_1$, and the host vehicle V1 at a single moment prior is positioned at $P_1'$. It is assumed that an adjacent vehicle V2 is positioned in the rear-side direction of the host vehicle V1 and is travelling parallel to the host vehicle V1, and that the adjacent vehicle V2 at the current moment is positioned at $P_2$, and the adjacent vehicle V2 at a single moment prior is positioned at $P_2'$. Also, it is assumed that the host vehicle V1 has moved a distance d in a single moment. The phrase "at a single moment prior" may be a moment in the past by a time set in advance (e.g., a single control cycle) from the current moment, or may be a moment in the past by an arbitrary time.

In such a state, a bird's-eye view image $PB_t$ at the current moment is illustrated in part (b) of FIG. 4. The white lines drawn on the road surface are rectangular in this bird's-eye view image $PB_t$ and are relatively accurate in a planar view, but the adjacent vehicle V2 (position $P_2$) is collapsed. The same applies to the bird's-eye view image $PB_{t-1}$ at a single moment prior; the white lines drawn on the road surface are rectangular and are relatively accurate in a planar view, but the adjacent vehicle V2 (position $P_2'$) is collapsed. As previously described, perpendicular edges of a three-dimensional object (edges that stand erect in three-dimensional space from the road surface are also included in a strict meaning of perpendicular edge) appear as a straight-line group along a collapsing direction due to the process for converting the viewpoint to bird's-eye view image data, but because a planar image on the road surface does not include perpendicular edges, such collapsing does not occur even when the viewpoint has been converted.

The alignment unit 32 aligns the bird's-eye view images $PB_t$ and $PB_{t-1}$, such as those described above, in terms of data. When this is carried out, the alignment unit 32 offsets the bird's-eye view image $PB_{t-1}$ at a single moment prior, and matches the position with the bird's-eye view image $PB_t$ at the current moment. The left-side image and the center image in part (b) of FIG. 4 illustrate the offset state by a movement distance d'. The offset amount d' is the amount of movement in the bird's-eye view image data that corresponds to the actual movement distance d of the host vehicle V1 illustrated in part (a) of FIG. 4, and is decided based on a signal from the speed sensor 20 and the time from a single moment prior to the current moment.

After alignment, the alignment unit 32 obtains the difference between the bird's-eye view images $PB_t$ and $PB_{t-1}$, and generates difference image $PD_t$ data. In the present embodiment, the alignment unit 32 takes the absolute value of the difference in the pixel values of the bird's-eye view images $PB_t$ and $PB_{t-1}$ in order correspond to variation in the illumination environment, and when the absolute value is equal to or greater than a predetermined threshold value th, the pixel values of the difference image $PD_t$ are set to "1," and when the absolute value is less than a predetermined threshold value th, the pixel values of the difference image $PD_t$ are set to "0," which allows difference image $PD_t$ data such as that illustrated on the right side of part (b) of FIG. 4 to be generated.

Returning to FIG. 3, the three-dimensional object detection unit 33 detects a three-dimensional object based on the difference image $PD_t$ data illustrated in part (b) of FIG. 4. In this case, the three-dimensional object detection unit 33 calculates the movement distance of the three-dimensional object in actual space. The three-dimensional object detection unit 33 first generates a difference waveform when the three-dimensional object is detected and the movement distance is to be calculated.

In generating the difference waveform $DW_t$, the three-dimensional object detection unit 33 sets a detection area in the difference image $PD_t$. An object of the three-dimensional object detection device 1 of the present example is to calculate the movement distance for the adjacent vehicle with which there is a possibility of contact should the host vehicle V1 change lanes. Accordingly, in the present example, rectangular detection areas A1, A2 are set behind the host vehicle V1, as illustrated in FIG. 2. Such detection areas A1, A2 may be set from a relative position to the host vehicle V1, or may be set based on the position of the white lines. When set based on the position of the white lines, the three-dimensional object detection device 1 may use, e.g., known white line recognition techniques.

The three-dimensional object detection unit 33 recognizes as ground lines L1, L2 the borders of the detection areas A1, A2 thus set, on the host vehicle V1 side (side along the traveling direction), as illustrated in FIG. 2. Generally, a ground line refers to a line in which a three-dimensional object is in contact with the ground, but in the present embodiment, a ground line is not a line in contact with the ground, but is rather set in the manner described above. Even in such a case, the difference between the ground line according to the present embodiment and the normal ground line determined from the position of the adjacent vehicle V2 is not exceedingly great as determined by experience, and there is no problem in actuality.

Figure 5:
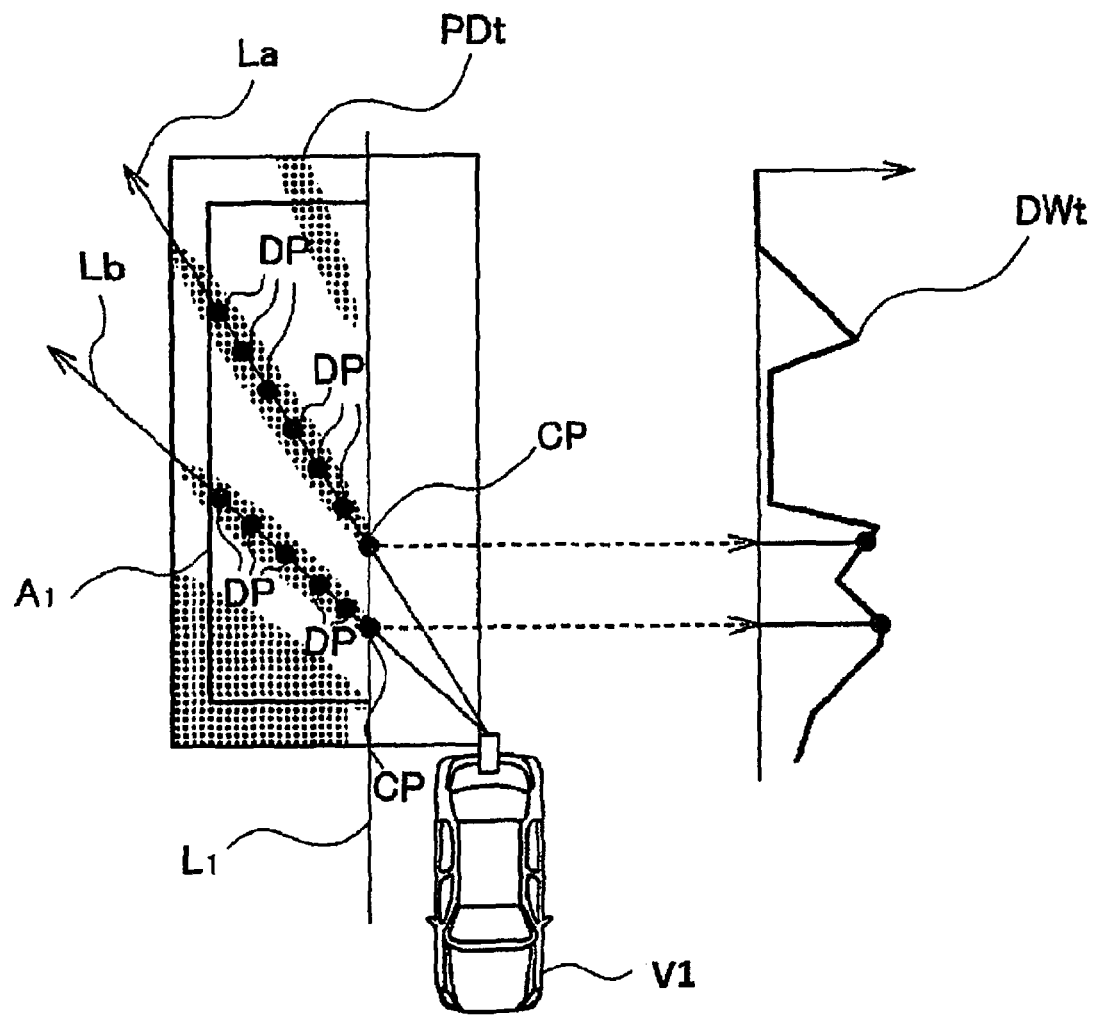
FIG. 5 is a schematic view illustrating the manner in which the difference waveform is generated by the three-dimensional object detection unit according to the first embodiment.

FIG. 5 is a schematic view illustrating the manner in which the difference waveform is generated by the three-dimensional object detection unit 33. As illustrated in FIG. 5, the three-dimensional object detection unit 33 generates a difference waveform $DW_t$ from the portion that corresponds to the detection areas A1, A2 in the difference image $PD_t$ (drawing on the right in part (b) of FIG. 4) calculated by the alignment unit 32. In this case, the three-dimensional object detection unit 33 generates a difference waveform $DW_t$ along the collapsing direction of the three-dimensional object by viewpoint conversion. In the example illustrated in FIG. 5, only the detection area A1 will be described for the sake of convenience, but the difference waveform $DW_t$ is generated for the detection area A2 as well using the same procedure.

More specifically, first, the three-dimensional object detection unit 33 defines a line La in the direction in which the three-dimensional object collapses in the difference image $PD_t$ data. The three-dimensional object detection unit 33 then counts the number of difference pixels DP indicating a predetermined difference on the line La. In the present embodiment, the difference pixels DP indicating a predetermined difference have pixel values in the difference image $PD_t$ that are represented by "0" and "1," and the pixels indicated by "1" are counted as difference pixels DP.

The three-dimensional object detection unit 33 counts the number of difference pixels DP, and thereafter determines the crossing point CP of the line La and the ground line L1. The three-dimensional object detection unit 33 then correlates the crossing point CP and the count number, decides horizontal-axis position, i.e., the position on the axis in the vertical direction in the drawing on the right in FIG. 5, based on the position of the crossing point CP, decides the vertical-axis position, i.e., the position on the axis in the lateral direction in the drawing on the right in FIG. 5, from the count number, and plots the positions as the count number at the crossing point CP.

Similarly, the three-dimensional object detection unit 33 defines the lines Lb, Lc, . . . in the direction in which the three-dimensional object collapses, counts the number of difference pixels DP, decides the horizontal-axis position based on the position of each crossing point CP, decides the vertical-axis position from the count number (the number of difference pixels DP), and plots the positions. The three-dimensional object detection unit 33 repeats the above in sequence to form a frequency distribution and thereby generate a difference waveform $DW_t$ as illustrated in the drawing on the right in FIG. 5.

Here, the difference pixels DP in the difference image $PD_t$ data are pixels which have changed in the image at different moments, in other words, locations that can be construed to be where a three-dimensional object was present. Accordingly, in locations where a three-dimensional object was present, the number of pixels is counted along the direction in which the three-dimensional object collapses to form a frequency distribution and thereby generate a difference waveform $DW_t$. In particular, the number of pixels is counted along the direction in which the three-dimensional object collapses, and a difference waveform $DW_t$ is therefore generated from information about the height direction in relation to the three-dimensional object.

The lines La and Lb in the direction in which the three-dimensional object collapses have different distances that overlap the detection area A1, as illustrated in the drawing on the left in FIG. 5. Accordingly, the number of difference pixels DP is greater on the line La than on the line Lb when it is assumed that the detection area A1 is filled with the difference pixels DP. For this reason, the three-dimensional object detection unit 33 performs normalization based on the distance that the lines La, Lb in the direction in which the three-dimensional object collapses and the detection area A1 overlap when the vertical-axis position is decided from the count number of the difference pixels DP. In a specific example, there are six difference pixels DP on the line La and there are five difference pixels DP on the line Lb in the drawing on the left in FIG. 5. Accordingly, when the vertical-axis position is decided from the count number in FIG. 5, the three-dimensional object detection unit 33 divides the count number by the overlapping distance or performs normalization in another manner. The values of the difference waveform $DW_t$ that correspond to the lines La, Lb in the direction in which the three-dimensional object collapses are thereby made substantially the same.

Figure 6:
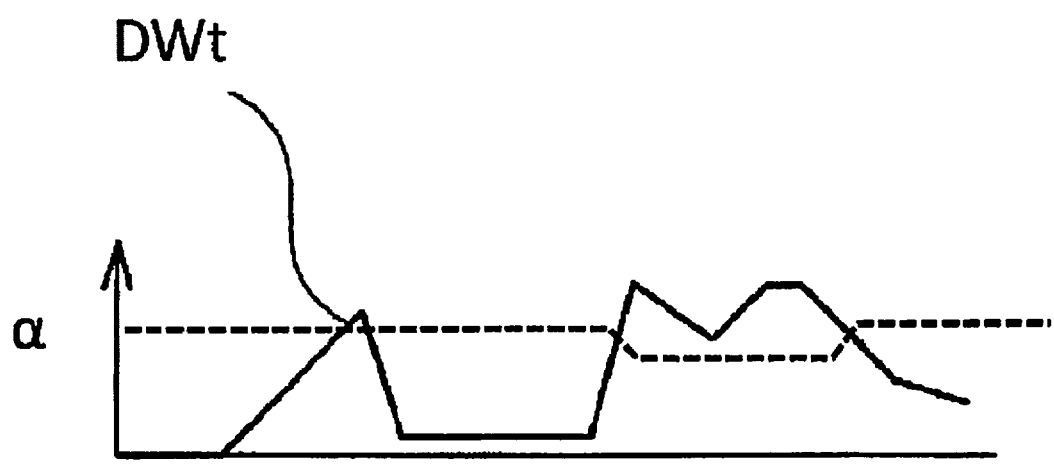
FIG. 6 is a view illustrating the method for detecting an adjacent vehicle according to the first embodiment.

After the difference waveform $DW_t$ has been generated, the three-dimensional object detection unit 33 detects an adjacent vehicle present in an adjacent lane based on the generated difference waveform $DW_t$. Here, FIG. 6 is a view for describing the method for detecting an adjacent vehicle as carried out by the three-dimensional object detection unit 33, and illustrates an example of the difference waveform $DW_t$ and the threshold value α for detecting an adjacent vehicle. The three-dimensional object detection unit 33 determines whether the peak of the generated difference waveform $DW_t$ is equal to or greater than the threshold value α corresponding to the position of the peak of the difference waveform $DW_t$, as illustrated in FIG. 6. The three-dimensional object detection unit 33 then determines that an adjacent vehicle is not present in the detection areas A1, A2 when the peak of the difference waveform $DW_t$ is less than the predetermined threshold value α, and conversely determines that an adjacent vehicle is present in the detection areas A1, A2 when the peak of the difference waveform $DW_t$ is at the predetermined threshold value α or greater to thereby detect an adjacent vehicle present in an adjacent lane.

Thus, the difference waveform $DW_t$ is a mode of distributed information of pixels that indicate a predetermined difference in luminance, and the "distributed information of pixels" in the present embodiment can be positioned with information indicating the state of distribution of "pixels having a difference in luminance that is equal to or greater than a predetermined threshold value" detected along the direction which the three-dimensional object collapses when the captured image is converted in viewpoint to create a bird's-eye view image. In other words, the three-dimensional object detection unit 33 detects, on the bird's-eye view image obtained by the viewpoint conversion unit 31, distributed information of pixels in which the luminance difference is a predetermined threshold value th or greater as the difference waveform $DW_t$ in the direction which the three-dimensional object collapses when the captured image is converted in viewpoint to create a bird's-eye view image, and furthermore detects a three-dimensional object based on the difference waveform $DW_t$ when the extent of distribution of pixels (the count number of difference pixels DP in the difference waveform $DW_t$) in the direction in which the three-dimensional object collapses is at a threshold value α or greater.

Described next is the method for setting the threshold value α for detecting an adjacent vehicle.

The threshold value α is set by the detection reference setting unit 34 illustrated in FIG. 3. The detection reference setting unit 34 sets the threshold value α for detecting the adjacent vehicle in accordance with the luminance in the detection positions in the detection areas A1, A2 (e.g., the average luminance of the difference pixels DP on the lines La, Lb, Lc, . . . in the direction in which the three-dimensional object collapses as illustrated in the drawing on the left in FIG. 5) and the positional relationship between the camera 10 and the light source, for each position in the detection areas A1, A2 (hereinafter referred to as detection positions in the detection areas A1, A2) that corresponds to the lines La, Lb, Lc . . . in the direction in which the three-dimensional object collapses as illustrated in the drawing on the left in FIG. 5. In this case, FIG. 7 is a graph illustrating an example of the relationship between the luminance in the detection positions in the detection areas A1, A2 and the threshold value α, and FIG. 8 is a view showing an example of the gain of the threshold value α set in accordance with the positional relationship between the camera 10 and the light source.

Figure 7:
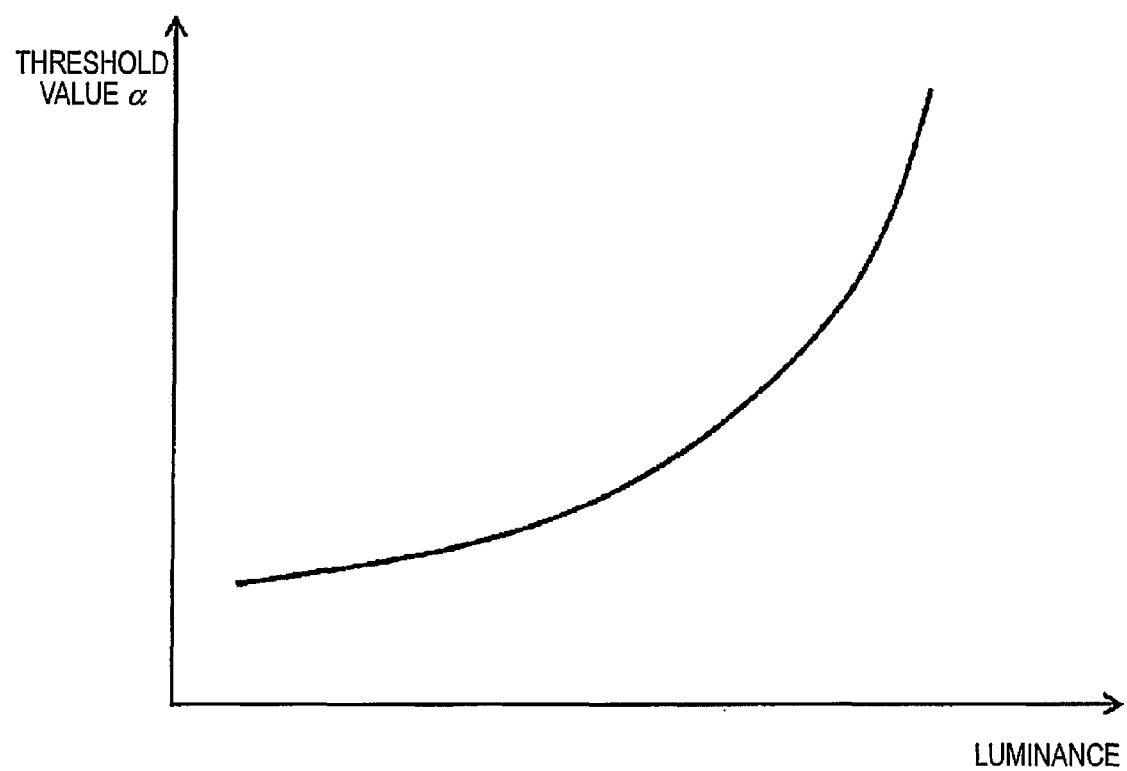
FIG. 7 is a view illustrating an example of the relationship between the luminance in the detection positions in the detection areas A1, A2 and the threshold value $\alpha$.

Specifically, the detection reference setting unit 34 sets the first threshold value α corresponding to the detection positions of the detection areas A1, A2 to a higher value in commensurate fashion to higher luminance in the detection positions in the detection areas A1, A2, as illustrated in FIG. 7. The peak of the difference waveform $DW_t$ based on the light from the headlights of an adjacent-adjacent vehicle is less than the first threshold value α and the effect of the light of the headlights of the adjacent-adjacent vehicle can be eliminated even when, e.g., the light of the headlights of the adjacent-adjacent vehicle (the vehicle present in the adjacent-adjacent lane two lanes away from the host vehicle lane) having high luminance is shined into the adjacent lane. It is therefore possible to effectively prevent an image of the light of the headlights of the adjacent-adjacent vehicle from being errantly detected as an adjacent vehicle.

The detection reference setting unit 34 furthermore modifies the gain of the threshold value α in accordance the position of the detection positions in the direction of progress of the host vehicle. In the present embodiment, the reference position $P_O$ illustrated in FIG. 8 corresponds to the position of the headlights an adjacent-adjacent vehicle or another light source, as described below, and the gain of the threshold value α is thereby set higher forward from the reference position $P_O$ in comparison with rearward from the reference position $P_O$, as illustrated in FIG. 8; and as a result, the threshold value α is set higher forward from the reference position $P_O$ in comparison with rearward from the reference position $P_O$.

Figure 8:
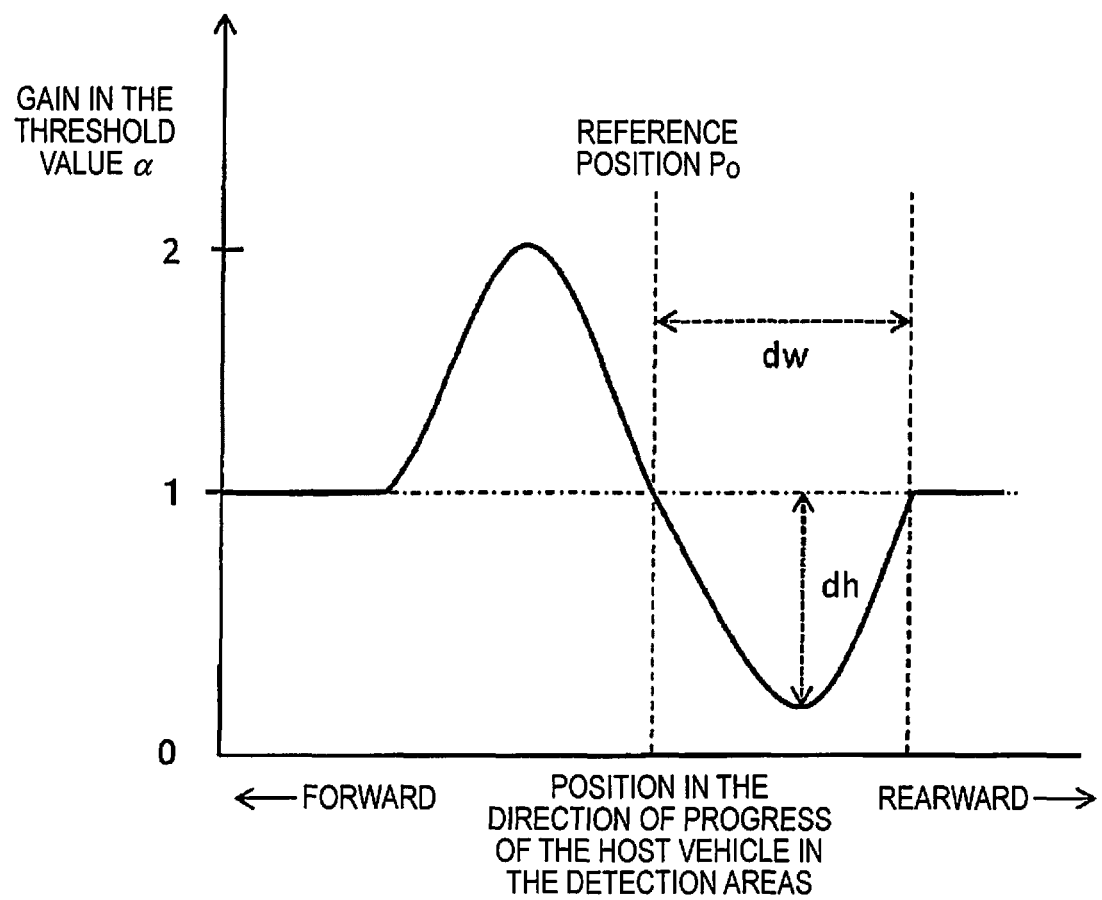
FIG. 8 is a view showing an example of the gain of the threshold value $\alpha$ set in accordance with the positional relationship between the camera and the light source.

On the other hand, since the gain in the threshold value α is set lower rearward from the reference position $P_O$ in comparison with forward from the reference position $P_O$, the threshold value α will be set lower rearward from the reference position $P_O$ than forward from the reference position $P_O$ when the luminance is the same, as illustrated in FIG. 8.

Figure 9:
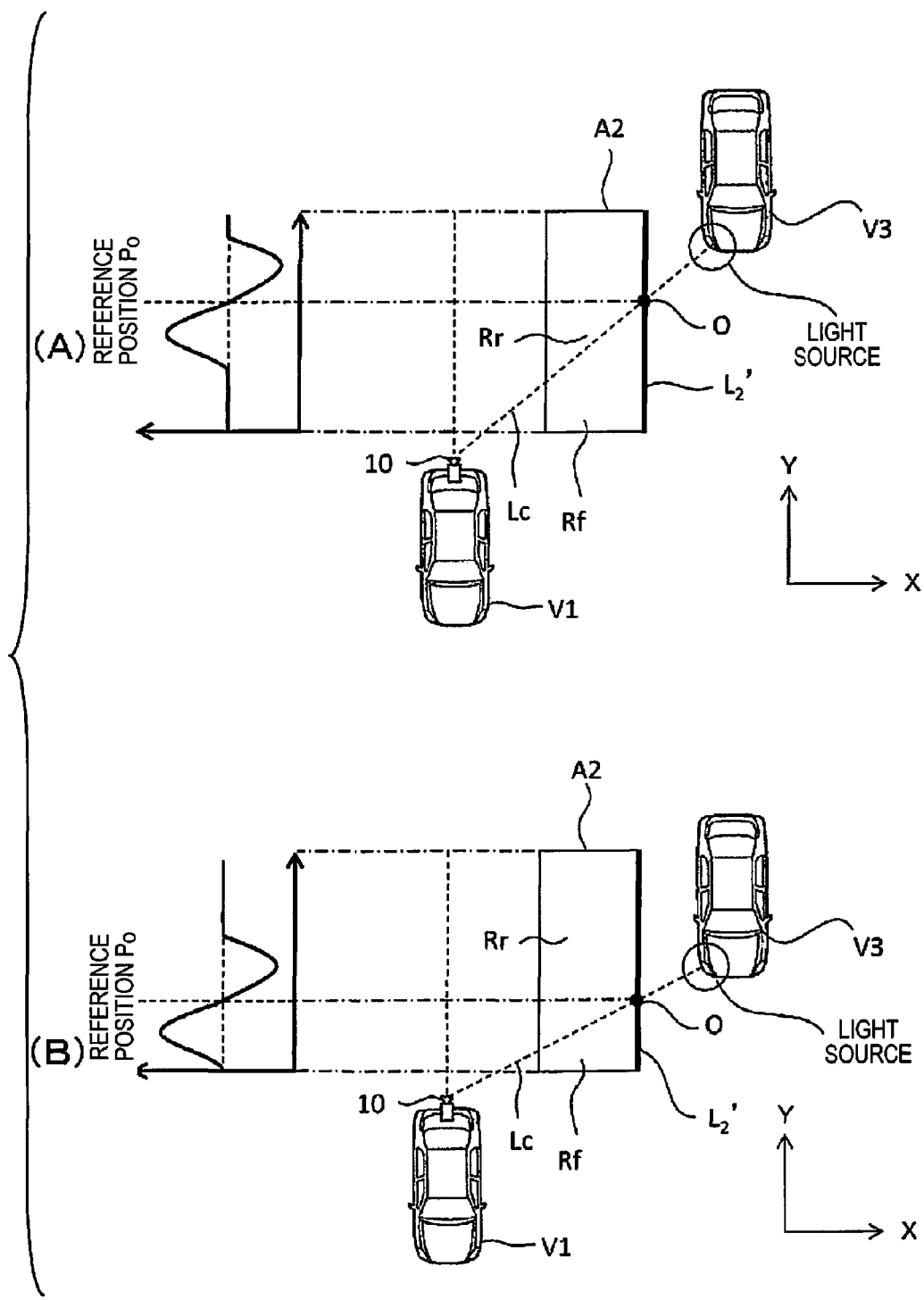
FIG. 9 is a view describing the method for adjusting the gain of the threshold value $\alpha$ illustrated in FIG. 8.
Figure 10:
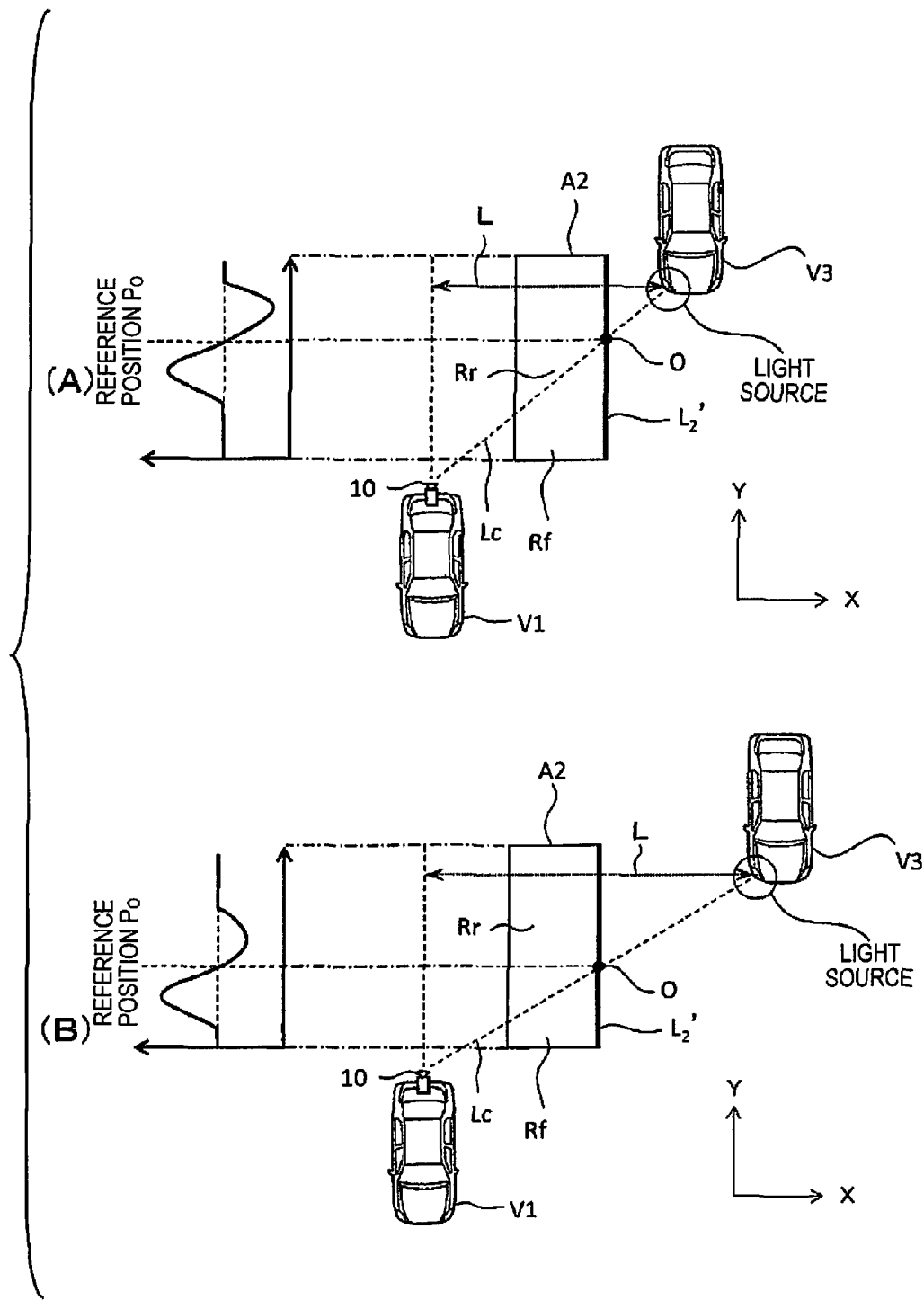
FIG. 10 is a view describing the method for adjusting the gain of the threshold value $\alpha$ illustrated in FIG. 8.

Also, in the present embodiment, the detection reference setting unit 34 adjusts the gain in the threshold value α illustrated in FIG. 8 in accordance with the positional relationship between the camera 10 and the light source. Described below is the method for adjusting the gain in the threshold value α illustrated in FIG. 8 with reference to FIGS. 9 and 10. FIGS. 9 and 10 are drawings for describing the method for adjusting the gain in the threshold value α illustrated in FIG. 8.

In other words, the detection reference setting unit 34 detects the headlights of an adjacent-adjacent vehicle V3 or other light sources from a captured image captured by the camera 10, as illustrated in the drawing on the right in part (A) of FIG. 9. The detection reference setting unit 34 then detects the centroid position of the detected light source, and sets a line Lc that passes through the centroid position of the light source and the center position of the camera 10. Furthermore, the detection reference setting unit 34 calculates the crossing point O between the line Lc and the side (side along the travel direction) L2' of the adjacent-adjacent lane-side of the detection area A2. The method for detecting a light source carried out by the detection reference setting unit 34 is later described.

The detection reference setting unit 34 adjusts the gain in the threshold value α in FIG. 8 so that the crossing point O and the reference position $P_O$ illustrated in FIG. 8 match each other, as illustrated in the drawing on the left in part (A) of FIG. 9. Here, part (B) of FIG. 9 gives an example of a situation in which the adjacent-adjacent vehicle V3 has approached the host vehicle V1 from the situation illustrated in part (A) of FIG. 9. In the situation illustrated in part (B) of FIG. 9, the adjacent-adjacent vehicle V3 has approached the host vehicle V1, and the crossing point O between the line Lc, and the line L2' in the detection area A2 has therefore moved further forward (negative Y-axis direction) from the crossing point O illustrated in part (A) of FIG. 9. Accordingly, when the gain in the threshold value α illustrated in FIG. 8 is adjusted by the detection reference setting unit 34 so that the position of the crossing point O illustrated in the drawing on the right in part (B) of FIG. 9 matches the reference position $P_O$ illustrated in FIG. 8, as illustrated in the drawing on the left in part (B) of FIG. 10, the gain in the threshold value α illustrated in FIG. 8 is shifted forward (negative Y-axis direction) overall, as illustrated in the drawing on the left in part (B) of FIG. 9, in comparison with the gain in the threshold value α illustrated in the drawing on the left in part (A) of FIG. 9, and the position of the light source and the reference position $P_O$ illustrated in FIG. 8 thereby correspond.

The gain in the threshold value α in the position of the light source is therefore maximal in the position of the light source, and the gain in the threshold value α is increased in positions near the light source, as illustrated in FIGS. 8 and 9. Accordingly, the threshold value α for detecting an adjacent vehicle is set to its highest value in the position of the light source, and the threshold value α for detected an adjacent vehicle is set to a high value in positions near the light source. As a result, it is possible to effectively prevent the headlights (light source) of an adjacent-adjacent vehicle from being errantly detected as an adjacent vehicle when the light source of an adjacent-adjacent vehicle is shined into an adjacent lane.

When the light source is the headlights of an adjacent vehicle, there may be cases in which the tire/wheel of an adjacent vehicle positioned rearward of the headlights (light source) is difficult to detect in an area Rr rearward from the light source. On the other hand, the possibility that the tire/wheel of an adjacent vehicle is present in the area Rr rearward from the light source is high. In view of this fact, in the present embodiment, the area Rr rearward from the light source is determined to be an area in which the possibility that an adjacent vehicle is present is at a predetermined value or higher, and the gain in the threshold value α is set lower in the area Rr rearward from the light source, as illustrated in FIGS. 8 and 9, thereby making it possible to suitably detect an adjacent vehicle positioned rearward from the light source.

Also, the gain in the threshold value α is set high in the area Rf forward from the light source (i.e.; the area in which Y<kX, where the Y direction is the direction of progress of the host vehicle and the X direction is the vehicle width direction in an XY plane, 0 is the position of the camera 10 in the Y direction, Y>0 is rearward of the camera 10, and Y=kX is the line Lc), as illustrated in FIGS. 8 and 9, and the gain in the threshold value α is set low in the area Rr rearward from the headlights (light source) (i.e., the area in which Y≥kX, where the Y direction is the direction of progress of the host vehicle and the X direction is the vehicle width direction in an XY plane, 0 is the position of the camera 10 in the Y direction, Y>0 is rearward of the camera 10, and Y=kX is the line Lc). Accordingly, when luminance is the same, the threshold value α is set high in the area Rf forward from the light source, and the threshold value α is set low in the area Rr rearward from the headlights (light source).

Figure 11:
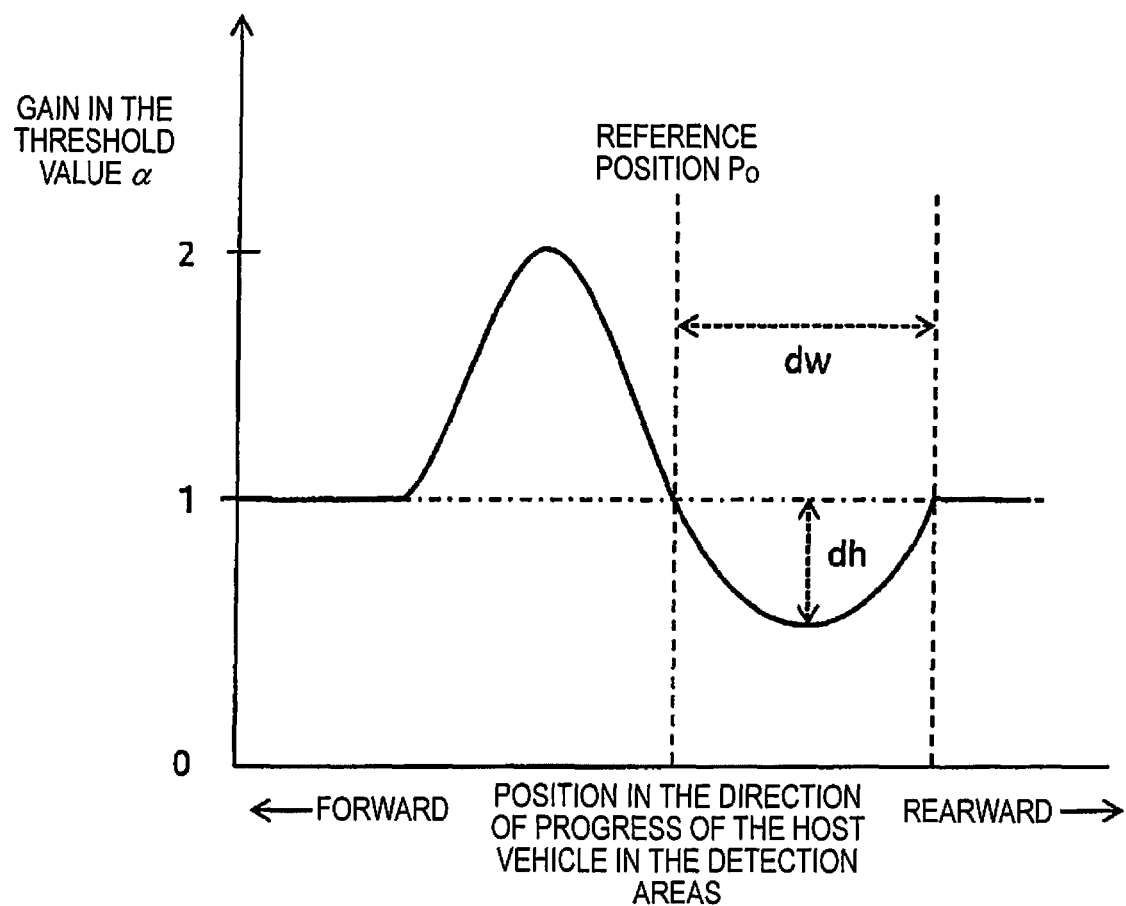
FIG. 11 is a view describing the method for adjusting the gain of the threshold value $\alpha$ that corresponds to the distance L.

Furthermore, the detection reference setting unit 34 adjusts the gain in the threshold value α illustrated in FIG. 8 in accordance with the distance L in the vehicle width direction (X-axis direction) from the center position of the camera 10 to the centroid position of the light source, as illustrated in FIGS. 8 and 9. Specifically, the detection reference setting unit 34 reduces the range of reduction dh of the gain in the threshold value α rearward from the reference position $P_O$ (the range of reduction dh with respect to the gain in the threshold value α at the reference position $P_O$ illustrated in FIG. 8) so that the threshold value α set rearward from the reference position $P_O$ is greater in commensurate fashion to a greater distance L from the center position of the camera 10 to the centroid position of the light source. For example, in the case of the gain in the threshold value α illustrated in FIG. 8 in the situation illustrated in part (A) of FIG. 10, the detection reference setting unit 34 adjusts the gain in the threshold value α illustrated in FIG. 8 so that the range of reduction dh of the gain in the threshold value α is less than the range of reduction dh of the gain in the threshold value α illustrated in FIG. 8, as illustrated in FIG. 11, when the distance L from the center position of the camera 10 to the centroid position of the light source has increased in comparison with part (A) of FIG. 10, as illustrated in part (B) of FIG. 10. The detection reference setting unit 34 can thereby set a threshold value α that will serve as a detection reference so that the three-dimensional object is more difficult to detect as the distance L in the vehicle width direction from the center position of the camera 10 to the centroid position of the light source increases in the area Rr rearward from the headlights (light source).

Figure 12:
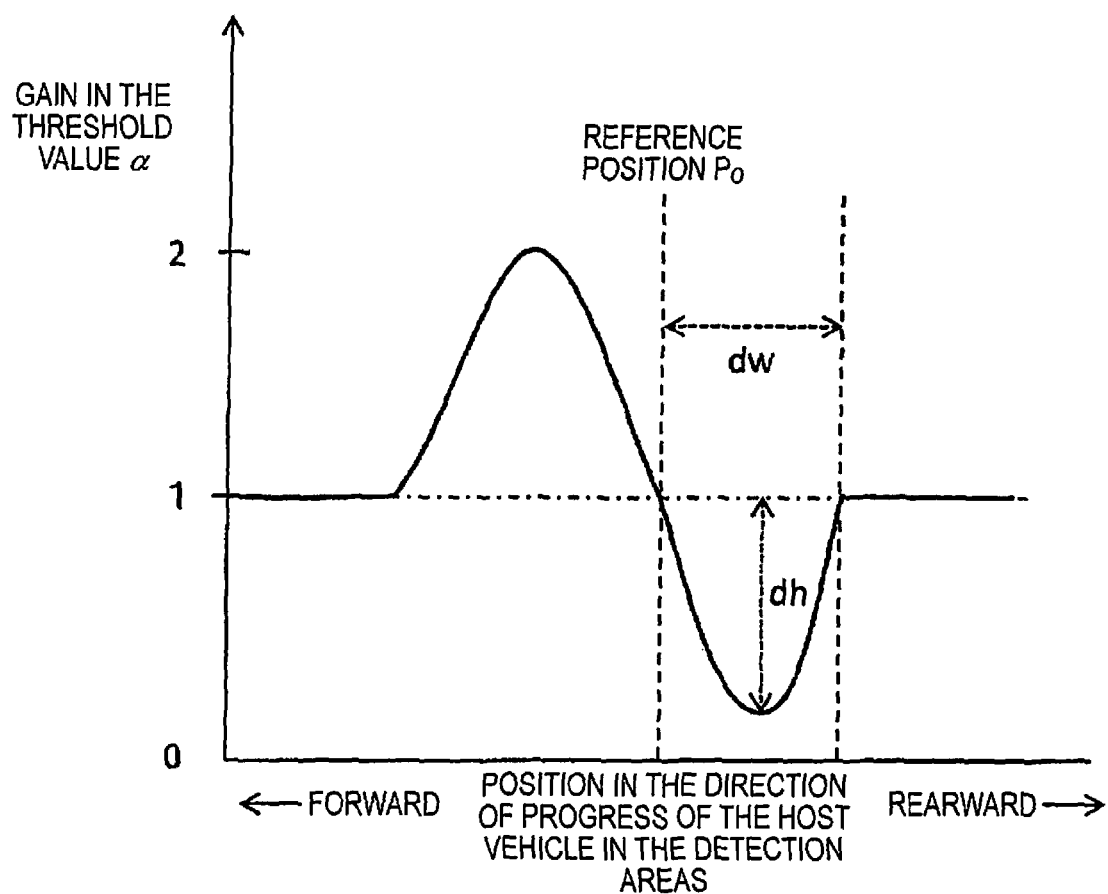
FIG. 12 is a view describing the method for adjusting the gain of the threshold value $\alpha$ that corresponds to the distance L.

In lieu of a configuration in which the detection reference setting unit 34 modifies the range of reduction dh of the gain in the threshold value α in accordance with the distance L from the center position of the camera 10 to the centroid position of the light source, as illustrated in FIG. 11, or in addition to this configuration, it is also possible to use a configuration in which the detection reference setting unit narrows a range dw in which the gain in the threshold value α changes to a lower value (a range that corresponds to the tire/wheel of an adjacent vehicle present rearward from the light source) with respect to the gain in the threshold value α in the reference position $P_O$, in commensurate fashion to an increase in the distance L from the center position of the camera 10 to the centroid position of the light source, as illustrated in FIG. 12. For example, when a gain in the threshold value α illustrated in FIG. 8 is to be obtained in the situation illustrated in part (A) of FIG. 10, the detection reference setting unit 34 narrows the range dw in which the gain in the threshold value α is reduced with respect to the reference position $P_O$, as illustrated in FIG. 12, when the distance L from the center position of the camera 10 to the centroid position of the light source has increased in comparison with part (A) of FIG. 10, as illustrated in part (B) of FIG. 10. In this case as well, since the range in which the threshold value α is set high is increased rearward from the reference position $P_O$ corresponding to the position of the light source, the effect of the headlights of an adjacent-adjacent vehicle V3 can be more suitably eliminated when the possibility that an adjacent-adjacent vehicle V3 is present is high in the area Rr further rearward from the light source.

The detection reference setting unit 34 modifies the threshold value α in order to effectively prevent light of the headlights of an adjacent-adjacent vehicle shined into an adjacent lane from being errantly detected as an adjacent vehicle. Accordingly, in the present embodiment, modification of the threshold value α by the detection reference setting unit 34 can be configured to be carried out only at nighttime when the headlights of an adjacent-adjacent vehicle V3 are on. The detection reference setting unit 34 may determine that it is nighttime when, e.g., the luminance of the image captured by the camera 10 is at a predetermined value or less.

Next, a description of the three-dimensional object detection unit 33 will be continued. After a three-dimensional object present in an adjacent lane has been detected, the three-dimensional object detection unit 33 calculates the movement distance of the three-dimensional object present in the adjacent lane by comparing the difference waveform $DW_t$ at the current moment and the difference waveform $DW_{t-1}$ at a single moment prior. In other words, the three-dimensional object detection unit 33 calculates the movement distance from the change in time of the difference waveforms $DW_t$, $DW_{t-1}$.

Figure 13:
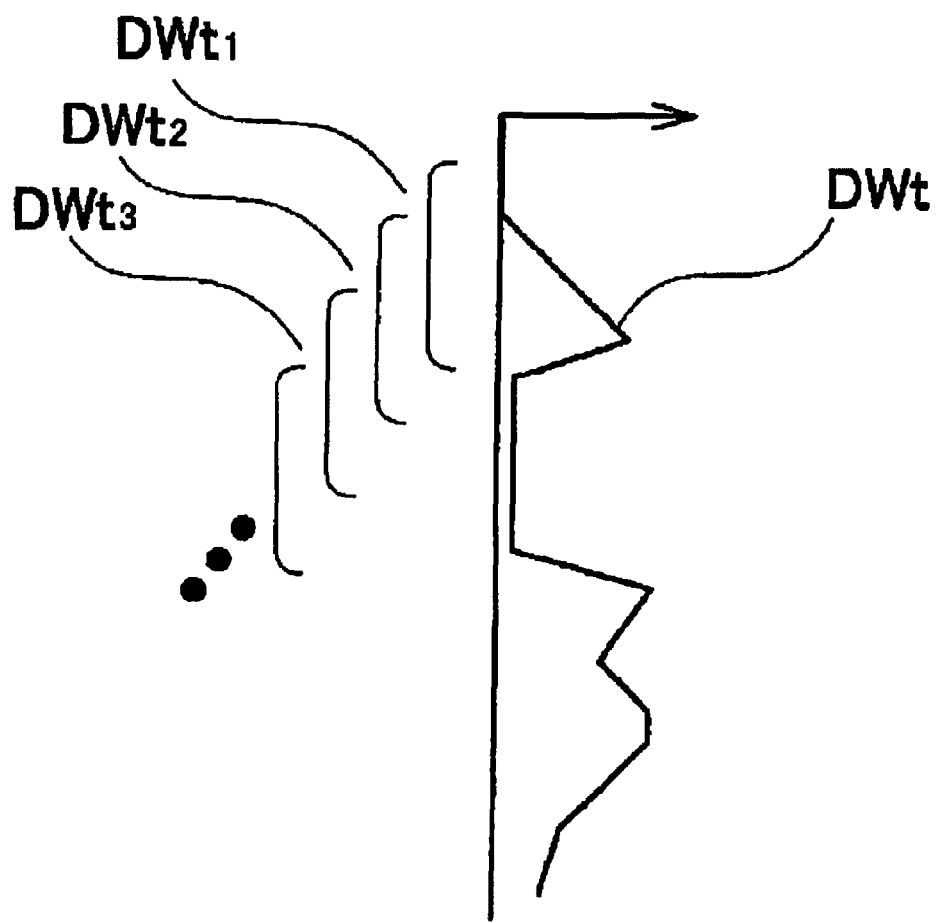
FIG. 13 is a view illustrating the small areas divided by the three-dimensional object detection unit according to the first embodiment.

More specifically, the three-dimensional object detection unit 33 divides the difference waveform $DW_t$ into a plurality of small areas $DW_{t1}$ to $DW_{tn}$ (where n is an arbitrary integer of 2 or greater), as illustrated in FIG. 13. FIG. 13 is a view illustrating the small areas $DW_{t1}$ to $DW_{tn}$ divided by the three-dimensional object detection unit 33. The small areas $DW_{t1}$ to $DW_{tn}$ are divided so as to be mutually overlapping, as illustrated in, e.g., FIG. 13. For example, the small area $DW_{t1}$ and the small area $DW_{t2}$ overlap each other, and the small area $DW_{t2}$ and the small area $DW_{t3}$ overlap each other.

Next, the three-dimensional object detection unit 33 determines the offset amount (the amount of movement in the horizontal-axis direction (vertical direction in FIG. 13) of the difference waveform) for each of the small areas $DW_{t1}$ to $DW_{tn}$. Here, the offset amount is determined from the difference (distance in the horizontal-axis direction) between the difference waveform $DW_{t-1}$ at a single moment prior and the difference waveform $DW_t$ at the current moment. In this case, the three-dimensional object detection unit 33 moves the difference waveform $DM_{t-1}$ at a single moment prior in the horizontal-axis direction for each of the small areas $DW_{t1}$ to $DW_{tn}$, and thereupon assesses the position (the position in the horizontal-axis direction) in which the error from the difference waveform $DW_t$ at the current moment is at a minimum, and determines as the offset amount the movement amount in the horizontal-axis direction at the position in which the error from the original position of the difference waveform $DW_{t-1}$ is at a minimum. The three-dimensional object detection unit 33 then counts the offset amount determined for each of the small areas $DW_{t1}$ to $DW_{tn}$ and forms a histogram.

Figure 14:
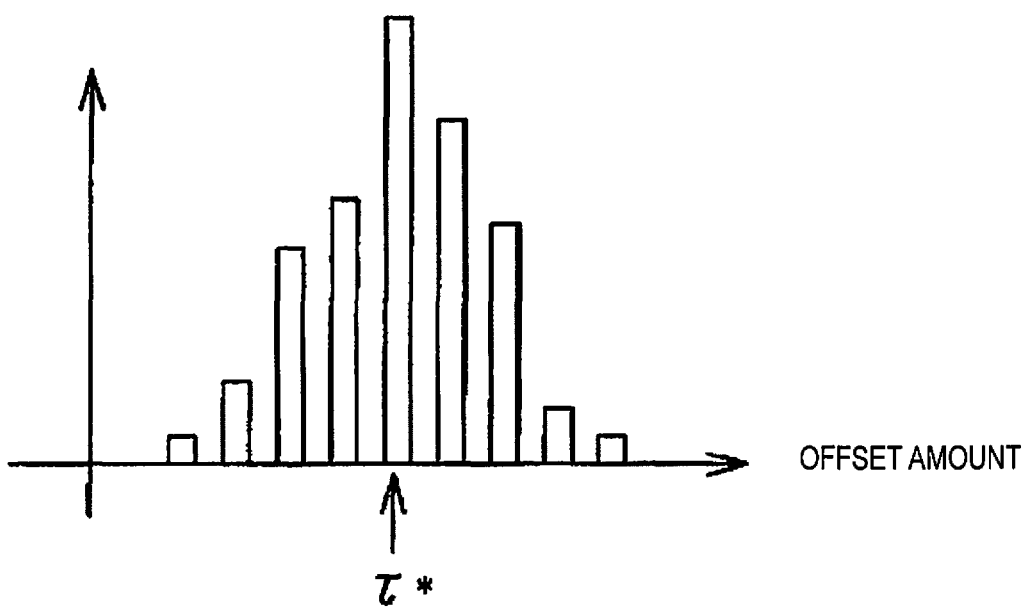
FIG. 14 is a view illustrating an example of the histogram obtained by the three-dimensional object detection unit according to the first embodiment.

FIG. 14 is a view illustrating an example of the histogram obtained by the three-dimensional object detection unit 33. As illustrated in FIG. 14, some amount of variability occurs in the offset amount, which is the movement distance in which the error between the small areas $DW_{t1}$ to $DW_{tn}$ and the difference waveform $DW_{t-1}$ at a single moment prior is at a minimum. Accordingly, the three-dimensional object detection unit 33 forms the offset amounts including the variability into a histogram and calculates the movement distance from the histogram. At this point, the three-dimensional object detection unit 33 calculates the movement distance of the three-dimensional object from the maximum value in the histogram. In other words, in the example illustrated in FIG. 14, the three-dimensional object detection unit 33 calculates the offset amount indicating the maximum value of the histogram as the movement distance τ*. In this manner, in the present embodiment, a more highly accurate movement distance can be calculated from the maximum value, even when there is variability in the offset amount. The movement distance τ* is the relative movement distance of the three-dimensional object in relation to the host vehicle. Accordingly, the three-dimensional object detection unit 33 calculates the absolute movement distance based on the movement distance τ* thus obtained and the speed sensor 20 when the absolute movement distance is to be calculated.

In this manner, in the present embodiment, the movement distance of the three-dimensional object is calculated from the offset amount of the difference waveform $DW_t$ when the error in the difference waveform $DW_t$ generated at different moments is at a minimum, and this allows the movement distance to be calculated from the offset amount, which is information about one dimension in a waveform, and allows computation cost to be kept low when the movement distance is calculated. Also, dividing the difference waveform $DW_t$ generated at different moments into a plurality of small areas $DW_{t1}$ to $DW_{tn}$ allows a plurality of waveforms representing the locations of the three-dimensional object to be obtained, thereby allowing the offset amount at each location of the three-dimensional object to be determined and allowing the movement distance to be determined from a plurality of offset amounts. Therefore, precision of calculating the movement distance can be improved. In the present embodiment, the movement distance of the three-dimensional object is calculated from the change in time of the difference waveform $DW_t$, which includes height direction information. Consequently, in contrast to the focus being solely on the movement of a single point, the detection location prior to change in time and the detection location after change in time are specified with height direction information included and accordingly readily end up being the same location; the movement distance is calculated from the change in time at the same location; and the precision for calculating the movement distance can be improved.

Figure 15:
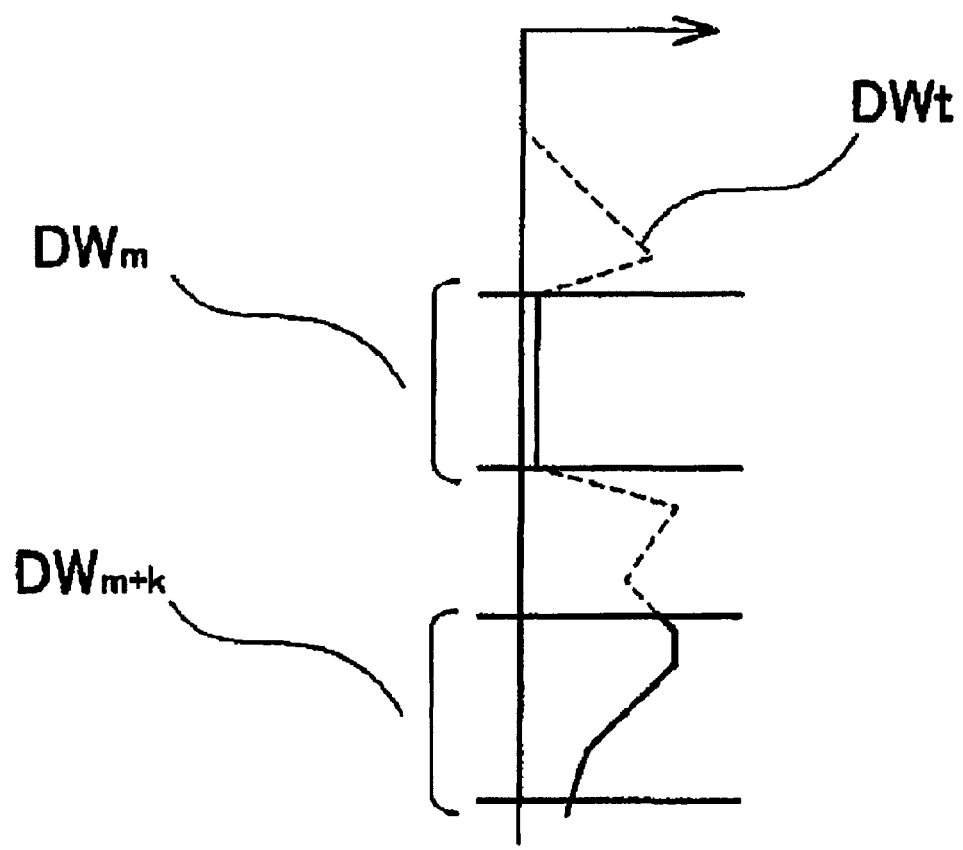
FIG. 15 is a view illustrating the weighting used by the three-dimensional object detection unit according to the first embodiment.

When a histogram is to be formed, the three-dimensional object detection unit 33 may impart a weighting to the plurality of small areas $DW_{t1}$ to $DW_{tn}$, and count the offset amounts determined for each of the small areas $DW_{t1}$ to $DW_{tn}$ in accordance with the weighting to form a histogram. FIG. 15 is a view illustrating the weighting used by the three-dimensional object detection unit 33.

As illustrated in FIG. 15, a small area $DW_m$ (where m is an integer 1 or greater and n−1 or less) is flat. In other words, in the small area $DW_m$, there is little difference between the maximum and minimum values of the count of number of pixels indicating a predetermined difference. The three-dimensional object detection unit 33 reduces the weighting of this type of small area $DW_m$. This is because the flat small area $DW_m$ lacks a characteristic and there is a high possibility that an error will be magnified when the offset amount is calculated.

On the other hand, a small area $DW_{m+k}$ (where k is an integer n−m or less) has abundant undulation. In other words, in the small area $DW_{m+k}$, there is considerable difference between the maximum and minimum values of the count of number of pixels indicating a predetermined difference. The three-dimensional object detection unit 33 increases the weighting of this type of small area $DW_{m+k}$. This is because the small area $DW_{m+k}$ abundant in undulation is characteristic and there is a high possibility that the offset amount will be accurately calculated. Weighting the small areas in this manner makes it possible to enhance the precision for calculating the movement distance.

The difference waveform $DW_t$ is divided into a plurality of small areas $DW_{t1}$ to $DW_{tn}$ in the present embodiment in order to enhance the precision for calculating the movement distance, but division into the small areas $DW_{t1}$ to $DW_{tn}$ is not required when the precision for calculating movement distance is not so needed. In this case, the three-dimensional object detection unit 33 calculates the movement distance from the offset amount of the difference waveform $DW_t$ when the error between the difference waveform $DW_t$ and the difference waveform $DW_{t-1}$ is at a minimum. In other words, the method for determining the offset amount between the difference waveform $DW_{t-1}$ at a single moment prior and the difference waveform $DW_t$ at the current moment is not limited to the details described above.

The three-dimensional object detection unit 33 in the present embodiment determines the movement speed of the host vehicle V1 (camera 10) and determines the offset amount for a stationary object from the determined movement speed. After the offset amount of the stationary object has been determined, the three-dimensional object detection unit 33 ignores the offset amount that corresponds to the stationary object within the maximum value of the histogram, and calculates the movement distance of the adjacent vehicle.

Figure 16:
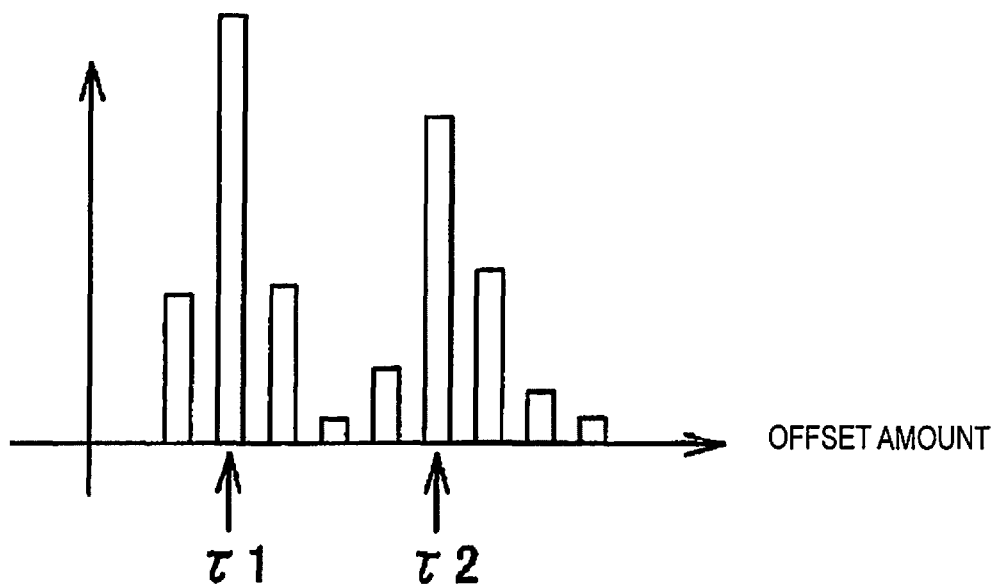
FIG. 16 is a view illustrating another example of the histogram obtained by the three-dimensional object detection unit according to the first embodiment.

FIG. 16 is a view illustrating another example of the histogram obtained by the three-dimensional object detection unit 33. When a stationary object other than the three-dimensional object is present within the view angle of the camera 10, two maximum values τ1, τ2 appear in the resulting histogram. In this case, one of the two maximum values τ1, τ2 is the offset amount of the stationary object. Consequently, the three-dimensional object detection unit 33 determines the offset amount for the stationary object from the movement speed, ignores the maximum value that corresponds to the offset amount, and calculates the movement distance of the three-dimensional object using the remaining maximum value. It is thereby possible to prevent a situation in which the precision for calculating the movement distance of the three-dimensional object is reduced by the stationary object.

Even when the offset amount corresponding to the stationary object is ignored, there may be a plurality of three-dimensional objects present within the view angle of the camera 10 when there is a plurality of maximum values. However, a plurality of three-dimensional objects present within the detection areas A1, A2 occurs very rarely. Accordingly, the three-dimensional object detection unit 33 stops calculating the movement distance. In the present embodiment, it is thereby possible to prevent a situation in which an errant movement distance is calculated such as when there is a plurality of maximum values.

Figure 17:
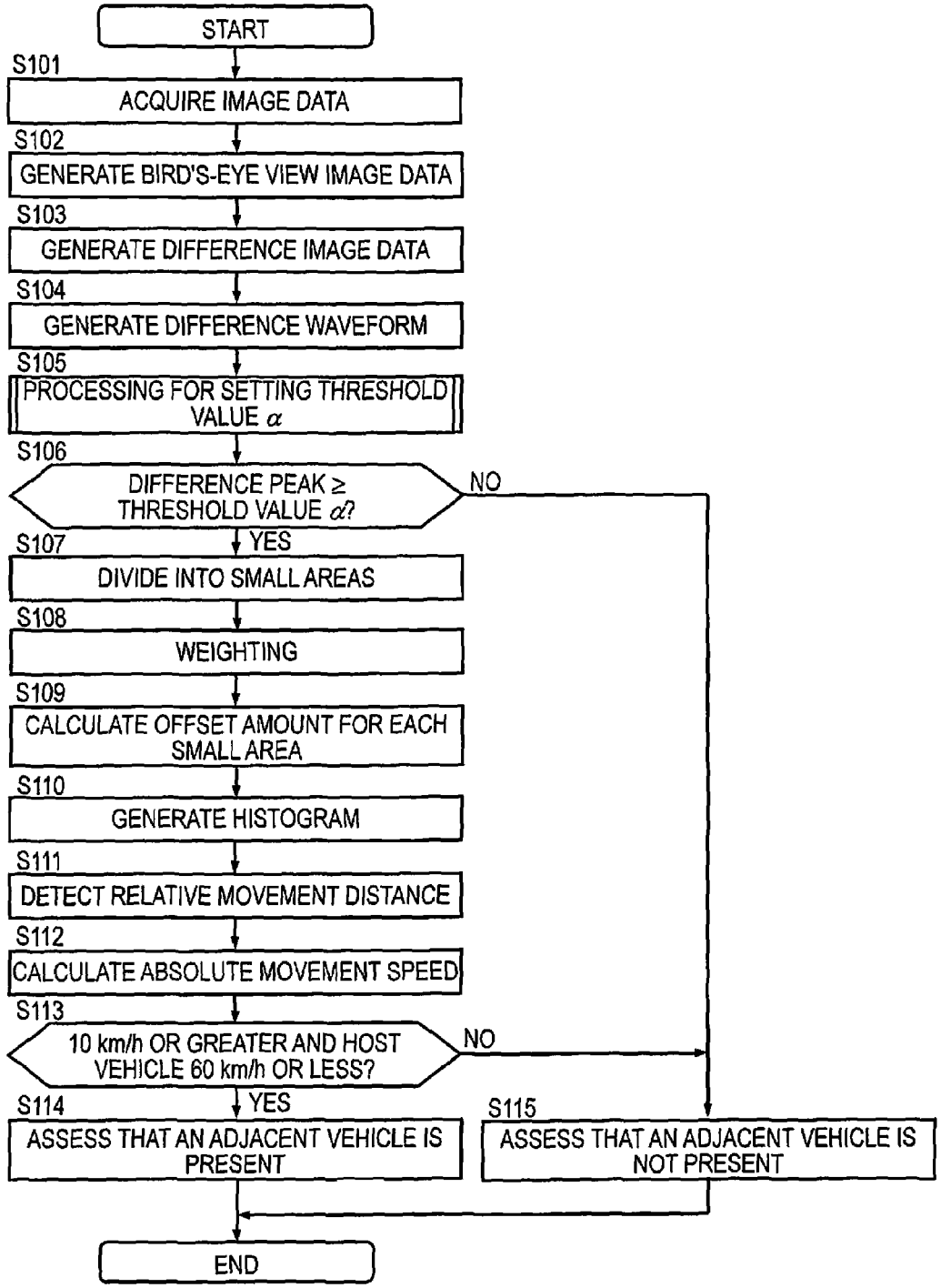
FIG. 17 is a flowchart illustrating the method for detecting an adjacent vehicle according to the first embodiment.

Described next is the process for detecting an adjacent vehicle in accordance with the present embodiment. FIG. 17 is a flowchart illustrating processes for detecting an adjacent vehicle according to the present embodiment. First, data of a captured image P is acquired by the computer 30 from the camera 10 (step S101), and data of a bird's-eye view image $PB_t$ is generated (step S102) by the viewpoint conversion unit 31 based on the data of the captured image P thus acquired, as illustrated in FIG. 17.

Next, the alignment unit 32 aligns the bird's-eye view image $PB_t$ data and the bird's-eye view image $PB_{t-1}$ data at a single moment prior, and generates difference image $PD_t$ data (step S103). The three-dimensional object detection unit 33 then counts the number of difference pixels DP having a pixel value of "1" to thereby generate a difference waveform $DW_t$ from the difference image $PD_t$ data (step S104).

Figure 18:
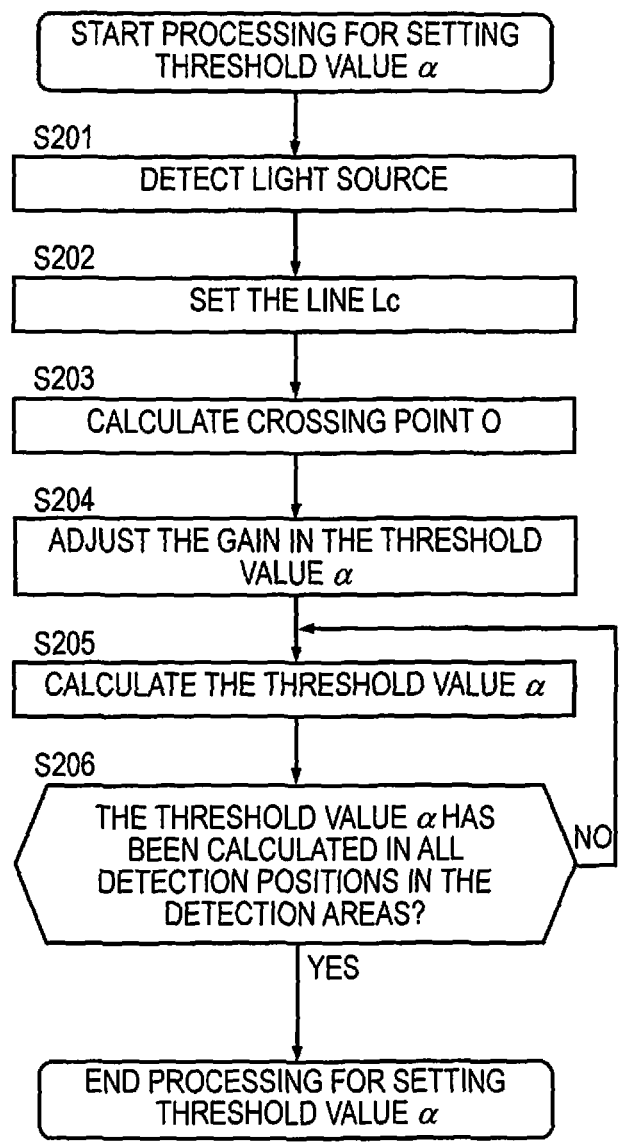
FIG. 18 is a flowchart illustrating the process for setting the threshold value $\alpha$ in step S105.

The detection reference setting unit 34 sets the threshold value α for detecting an adjacent vehicle (step S105). Here, FIG. 18 is a flowchart illustrating the process for setting the threshold value α of step S105. The detection reference setting unit 34 first detects the headlights of an adjacent-adjacent vehicle or other light source from the captured image captured by the camera 10 (step S201), as illustrated in FIG. 18.

Here, the detection reference setting unit 34 detects an image area of the captured image having a size of a predetermined value $s_1$ or greater and in which the difference in brightness with the surroundings is at a predetermined value $s_d$ or greater in order to eliminate the effect of noise and suitably detect the headlights of another vehicle as a light source.

Accordingly, the detection reference setting unit 34 first subjects the captured image to edge processing and detects areas in which the difference in brightness from the surroundings is at the predetermined value $s_d$ or greater, these areas being light source candidates. In the present embodiment, the detection reference setting unit 34 is not limited to the predetermined value $s_d$ being a fixed value, and is capable of modifying the predetermined value $s_d$ based on, e.g., the rearward distance from the camera 10 to the light source candidate, or the luminance of the area in which the light source candidate is present, in order to suitably detect a light source. For example, the detection reference setting unit 34 can have a threshold value map in which the predetermined value $s_d$ is set in accordance with the luminance and a threshold value map in which the predetermined value $s_d$ is set in accordance with the rearward distance from the camera 10 to the light source candidate, compare the two threshold value maps, and select the higher predetermined value $s_d$ among the predetermined value $s_d$ obtained from these threshold value maps as the predetermined value $s_d$ for detecting the light source candidate.

The detection reference setting unit 34 then detects as the area corresponding to the light source the image area having a size of a predetermined value $s_1$ or greater among the detected light source candidates. The predetermined value s1 is also not limited to being a fixed value, and the detection reference setting unit 34 may modify the predetermined value s1 in accordance with, e.g., the rearward distance from the camera 10 to the light source candidate. For example, when the length of the detection areas A1, A2 in the direction of progress of the host vehicle is 10 m, the detection reference setting unit 34 divides the detection areas A1, A2 into three areas, beginning from the position in the detection areas A1, A2 nearest to the camera 10: an area R1, which is 0 to 1.5 m in the direction of progress of the host vehicle; an area R2, which is 1.5 to 6 m; and an area R3, which is 6 m to 10 m. The detection reference setting unit 34 detects an image area in which the length and breadth is, e.g., 5×5 pixels or greater as the area corresponding to the light source in area R1 nearest to the host vehicle and area R3 farthest from the host vehicle in the detection areas A1, A2, and detects an image area in which the length and breadth is, e.g., 7×7 pixels or greater as the area corresponding to the light source in area R2 in the center of the detection areas A1, A2.

When a light source could not be detected in step S201, the threshold value α illustrated in FIG. 7 is calculated as the threshold value α for detecting an adjacent vehicle, and the process for setting the threshold value α of step S105 is ended.

Next, the detection reference setting unit 34 sets the line Lc that passes through the centroid position of the detected light source and the center position of the camera 10 (step S202), as illustrated in the drawing on the right in part (A) of FIG. 10, and the detection reference setting unit 34 furthermore calculates the crossing point O between the line Lc thus set and a side L2' on the adjacent-adjacent vehicle-side of the detection area A2 (step S203). The detection reference setting unit 34 adjusts the gain in the threshold value α so that the crossing point O calculated in step S203 and the reference position $P_O$ illustrated in FIG. 8 match (step S204), as illustrated in the drawing on the left in part (B) of FIG. 10.

The detection reference setting unit 34 modifies the threshold value α set in accordance with the luminance using the gain in the threshold value α adjusted in step S204, as illustrated in FIG. 7, to thereby calculated the threshold value α for detecting an adjacent vehicle (step S205). The detection reference setting unit 34 then calculates the threshold value α for all of the detection positions in the detection areas A1, A2, and calculating the threshold value α for all of the detection positions in the detection areas A1, A2 (step S206=Yes) sets the threshold value α for detecting an adjacent vehicle based on the difference waveform $DW_t$, as illustrated in FIG. 6.

Returning to FIG. 17, the three-dimensional object detection unit 33 determines (step S106) whether the peak of the difference waveform $DW_t$ generated in step S104 is equal to or greater than the threshold value α that corresponds to the position in which the peak of the difference waveform $DW_t$ was detected, based on the threshold value set in step S105. When the peak of the difference waveform $DW_t$ is not at the threshold value α or greater, i.e., when there is essentially no difference, it is possible to consider that a three-dimensional object is not present in the captured image P. Accordingly, when it has been determined that the peak of the difference waveform $DW_t$ is not at the threshold value α or greater (step S106=No), the three-dimensional object assessment unit 33 determines that another vehicle is not present in the adjacent lane (step S115) and ends the process illustrated in FIG. 17.

On the other hand, when the peak in the difference waveform $DW_t$ is determined to be at a threshold value α or greater (step S106=Yes), the three-dimensional object assessment unit 33 determines that a three-dimensional object is present in the adjacent lane and proceeds to step S107, and the difference waveform $DW_t$ is divided in to a plurality of small areas $DW_{t1}$ to $DW_{tn}$ by the three-dimensional object detection unit 33. The three-dimensional object detection unit 33 next imparts weighting to each of the small areas $DW_{t1}$ to $DW_{tn}$ (step S108), calculates the offset amount for each of the small areas $DW_{t1}$ to $DW_{tn}$ (step S109), and generates a histogram with consideration given to the weightings (step S110).

The three-dimensional object detection unit 33 then calculates the relative movement distance, which is the movement distance of the adjacent vehicle in relation to the host vehicle, based on the histogram (step S111). The three-dimensional object detection unit 33 furthermore calculates the relative movement speed of the adjacent vehicle from the relative movement distance (step S112). At this point the three-dimensional object detection unit 33 time-differentiates the relative movement distance to calculate the relative movement speed, and adds the host vehicle speed detected by the speed sensor 20 to calculate the absolute movement speed of the adjacent vehicle.

The three-dimensional object detection unit 33 thereafter determines whether the absolute movement speed of the adjacent vehicle is 10 km/h or more and whether the relative movement speed of the adjacent vehicle in relation to the host vehicle is +60 km/h or less (step S113). When both conditions are satisfied (step S113=Yes), the three-dimensional object detection unit 33 determines that an adjacent vehicle is present in the adjacent lane (step S114). The process illustrated in FIG. 17 is then ended. On the other hand, when either one of the conditions is not satisfied (step S113=No), the three-dimensional object detection unit 33 determines that an adjacent vehicle is not present in the adjacent lane (step S115). The process illustrated in FIG. 17 is then ended.

In the present embodiment, the detection areas A1, A2 are the rearward side directions of the host vehicle, and focus is placed on whether the host vehicle may possibly make contact with an adjacent vehicle should a lane change be made. Accordingly, the process of step S113 is executed. In other words, assuming that the system in the present embodiment is actuated on an expressway, when the speed of an adjacent vehicle is less than 10 km/h, it would rarely be a problem even if an adjacent vehicle were to be present because the adjacent vehicle would be positioned far behind the host vehicle when a lane change is made. Similarly, when the relative movement speed of an adjacent vehicle exceeds +60 km/h in relation to the host vehicle (i.e., when the adjacent vehicle is moving at a speed 60 km/h greater than the speed of the host vehicle), it would rarely be a problem because the adjacent vehicle would be positioned ahead of the host vehicle when a lane change is made. Consequently, it can be construed that step S113 determines an adjacent vehicle what would be a problem should a lane change be made.

In step S113, it is determined whether the absolute movement speed of the adjacent vehicle is 10 km/h or greater, and whether the relative movement speed of the adjacent vehicle in relation to the host vehicle is +60 km/h or less, thereby obtaining the following effect. For example, a possible case is that the absolute movement speed of a stationary object is detected to be several kilometers per hour depending on the attachment error of the camera 10. Accordingly, determining whether the speed is 10 km/h or greater makes it possible to reduce the possibility that the stationary object will be determined to be an adjacent vehicle. Also, it is possible that the relative speed of an adjacent vehicle in relation to the host vehicle will be detected to be in excess of +60 km/h due to noise. Accordingly, determining whether the relative speed is +60 km/h or less makes it possible to reduce the possibility of errant detection due to noise.

In lieu of the processing in step S113, it may be determined that the relative movement speed of the adjacent vehicle is not a negative value, or is not 0 km/h. Also, in the present embodiment, since focus is placed on whether there is a possibility that contact will be made should the host vehicle make a lane change, a warning sound may be emitted to the driver of the host vehicle, or a display corresponding to a warning may be provided by a predetermined display device when a adjacent vehicle has been detected in step S114.

Thus, in the first embodiment, the detection areas A1, A2 rearward of the host vehicle are captured at different moments, the captured images thus captured are converted to bird's-eye view images, and a difference image $PD_t$ is generated based on the difference between the bird's-eye view images at different moments. The number of pixels that indicate a predetermined difference is counted along the direction in which the three-dimensional object collapses due to viewpoint conversion and a frequency distribution is formed to thereby generate a difference waveform $DW_t$ from the difference image $PD_t$ data. It is then determined whether the peak in the generated difference waveform $DW_t$ is at a threshold value α or higher set in accordance with the rearward distance from the camera 10 or the positional relationship between the camera 10 and the light source, and when the peak in the difference waveform $DW_t$ is at the threshold value α or higher, it is determined that an adjacent vehicle is present in the adjacent lane, and the adjacent vehicle present in the adjacent lane can thereby be suitably detected.

In other words, in the present embodiment, the threshold value α is modified in accordance with the luminance, as illustrated in FIG. 7. In the detection of an adjacent vehicle, it is thereby possible to eliminate the effect of light of the headlights of an adjacent-adjacent vehicle having high luminance, and to suitably detect an adjacent vehicle. Furthermore, in the present embodiment, the light source to the rear and side of the host vehicle is detected, and the threshold value α for detecting an adjacent vehicle is modified in accordance with the position of the detected light source. Specifically, in the present embodiment, the gain in the threshold value α is set higher forward from the reference position $P_O$ corresponding to the position of the light source, and lower rearward from the reference position $P_O$, as illustrated in FIG. 8. In accordance with the present embodiment, since the threshold value α for detecting an adjacent vehicle can be set low rearward of the headlights (light source), it is possible to suitably detect the tire/wheel of an adjacent vehicle present rearward from the headlights (light source), even when, e.g., the luminance in the vicinity of the headlights (light source) is high due to soil on the lens of the camera 10, and the tire/wheel of the adjacent vehicle positioned rearward from the headlights (light source).

When the light from the headlights (light source) of an adjacent-adjacent vehicle is shined into the adjacent lane, the light from the headlights (light source) may be reflected into the adjacent lane and the reflected light may be detected in the area forward from the headlights (light source). Even in such a case, in accordance with the present embodiment, the threshold value α for detecting an adjacent vehicle in the area forward from the headlights (light source) can be increased with respect to luminance, and the image of reflected light that is reflected in an adjacent lane can be effectively prevented from being errantly detected as an adjacent vehicle.

Furthermore, in the present embodiment, the gain in the threshold value α illustrated in FIG. 9 is adjusted in accordance with the distance L in the vehicle width direction from the center position of the camera 10 to the centroid position of the light source. Specifically, the range of reduction dh of the gain in the threshold value α rearward from the reference position $P_O$ is reduced so that the greater the distance L from the center position of the camera 10 to the centroid position of the light source is, the greater the threshold value α rearward from the light source is, as illustrated in FIG. 11. Here, the more the detected headlights (light source) are separated from the camera 10 in the vehicle width direction (X-axis direction), the possibility that the detected headlights are the headlights of an adjacent-adjacent vehicle is higher than the possibility that the detected headlights are the headlights of an adjacent vehicle. Accordingly, in the present embodiment, the greater the distance L from the center position of the camera 10 to the centroid position of the light source is, the detected headlights are determined to be those of the headlights of an adjacent-adjacent vehicle, and the range of reduction dh of the gain in the threshold value α rearward from the reference position $P_O$ is reduced, as illustrated in FIG. 11. The threshold value α rearward from the reference position $P_O$ which corresponds to the position of the light source can thereby be increased in comparison with the case illustrated in FIG. 8, and the effect of the headlights of an adjacent-adjacent vehicle can be more suitably eliminated in the area rearward from the light source. Also, in similar fashion, the effect of the headlights of an adjacent-adjacent vehicle can be more suitably eliminated even when the range dw in which the gain in the threshold value α is reduced is narrowed with respect to the gain in the threshold value α in the reference position $P_O$ in commensurate fashion to an increase in the distance L from the center position of the camera 10 to the centroid position of the light source, as illustrated in FIG. 12.

Figure 19:
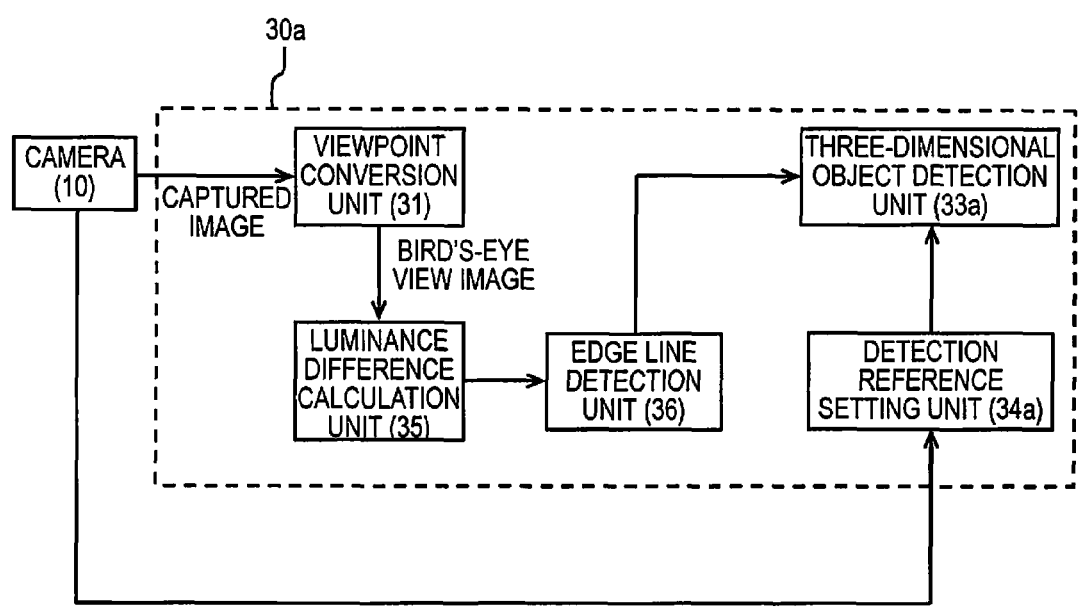
FIG. 19 is a block diagram illustrating the details of the computer according to the second embodiment.

Described next is a three-dimensional object detection device 1a according to the second embodiment. The three-dimensional object detection device 1a according to the second embodiment is the same as the first embodiment, except that a computer 30a is provided in lieu of the computer 30 of the first embodiment, as illustrated in FIG. 19, and the operation is as described below. Here, FIG. 19 is a block view illustrating the details of the computer 30a according to the second embodiment.

The three-dimensional object detection device 1a according to the second embodiment is provided with a camera 10 and a computer 30a, as illustrated in FIG. 19. The computer 30a is provided with a viewpoint conversion unit 31, a luminance difference calculation unit 35, an edge line detection unit 36, a three-dimensional object detection unit 33a, and a detection reference setting unit 34a. The configurations of the three-dimensional object detection device 1a according to the second embodiment are described below.

Figure 20:
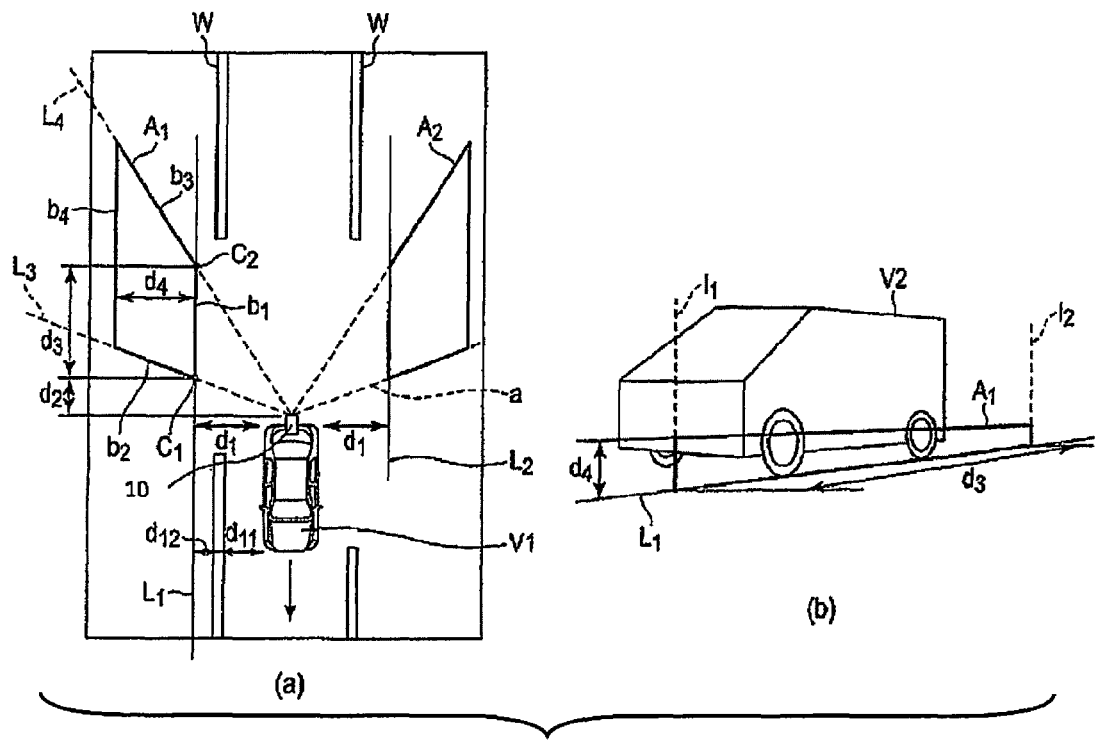
FIG. 20 is a view illustrating the travel state of the vehicle, with part (a) illustrating the positional relationship between the detection area and the like from a top plan view, and part (b) illustrating the positional relationship between the detection area and the like in real space in perspective.

FIG. 20 is a view illustrating the image capturing range of the camera 10 in FIG. 19, part (a) of FIG. 20 being a plan view, and part (b) of FIG. 20 being a perspective view in real space rearward from the host vehicle V1. The camera 10 is set to a predetermined view angle a, and the rearward side of the host vehicle V1 included in the predetermined view angle a is captured, as illustrated in part (a) of FIG. 20. The view angle a of the camera 10 is set so that adjacent lanes are included in the capture range of the camera 10 in addition to the lane in which the host vehicle V1 is traveling, in the same manner as illustrated in FIG. 2.

The detection areas A1, A2 in the present example are trapezoidal in a plan view (bird's-eye view state), the position, size, and shape of the detection areas A1, A2 are decided based on distances $d_1$ to $d_4$. The detection areas A1, A2 of the example illustrated in the drawing are not limited to being trapezoidal, and may also be rectangular or another shape in a bird's-eye view state, as illustrated in FIG. 2.

Here, the distance d1 is the distance from the host vehicle V1 to the ground lines L1, L2. The ground lines L1, L2 refer to a line in which a three-dimensional object, which is present in a lane adjacent to the lane in which the host vehicle V1 is traveling, is in contact with the ground. In the present embodiment, an object is to detect an adjacent vehicle V2 or the like (including two-wheeled vehicles or the like) traveling in the left or right lane behind the host vehicle V1 and adjacent to the lane of the host vehicle V1. Accordingly, the distance d1, which is the position of the ground lines L1, L2 of the adjacent vehicle V2, can be decided so as to be substantially fixed from the distance d11 from the host vehicle V1 to a white line W and the distance d12 from the white line W to the position in which the adjacent vehicle V2 is predicted to travel.

The distance d1 is not limited to being fixedly decided, and may be variable. In this case, the computer 30a recognizes the position of the white line W in relation to the host vehicle V1 using white line recognition or another technique, and the distance d11 is decided based on the position of the recognized white line W. The distance d1 is thereby variably set using the decided distance d11. In the present embodiment described below, the position in which the adjacent vehicle V2 is travelling (the distance d12 from the white line W) and the position in which the host vehicle V1 is travelling (the distance d11 from the white line W) is mostly predictable, and the distance d1 is fixedly decided.

A distance d2 is the distance extending from the rear end part of the host vehicle V1 in the vehicle progress direction. The distance d2 is decided so that the detection areas A1, A2 are accommodated within at least the view angle a of the camera 10. In the present embodiment in particular, the distance d2 is set so as to be in contact with a range partitioned within the view angle a. The distance d3 indicates the length of the detection areas A1, A2 in the vehicle progression direction. The distance d3 is decided based on the size of the three-dimensional object to be detected. In the present embodiment, the object to be detected is an adjacent vehicle V2 or the like, and therefore the distance d3 is set to a length that includes the adjacent vehicle V2.

The distance d4 indicates the height, which has been set so that the tires of the adjacent vehicle V2 or the like are included in real space, as illustrated in part (b) of FIG. 20. In a bird's-eye view image, the distance d4 is the length illustrated in part (a) of FIG. 20. The distance d4 may also be a length that does not include lanes further adjacent to the left and right adjacent lanes in the bird's-eye view image (i.e., adjacent-adjacent lanes two lanes away). This is because when the lanes two lanes away from the lane of the host vehicle V1 are included, it is no longer possible to distinguish whether an adjacent vehicle V2 is present in the adjacent lanes to the left and right of the lane in which the host vehicle V1 is traveling, or whether an adjacent-adjacent vehicle is present in an adjacent-adjacent lane two lanes away.

As described above, the distances d1 to d4 are decided, and the position, size, and shape of the detection areas A1, A2 are thereby decided. More specifically, the position of the top side b1 of the detection areas A1, A2 that form a trapezoid is decided by the distance d1. The starting position C1 of the top side b1 is decided by the distance d2. The end position C2 of the top side b1 is decided by the distance d3. The lateral side b2 of the detection areas A1, A2 that form a trapezoid is decided by a straight line L3 extending from the camera 10 toward the starting position C1. Similarly, the lateral side b3 of the detection areas A1, A2 that form a trapezoid is decided by a straight line L4 extending from the camera 10 toward the end position C2. The position of the lower side b4 of the detection areas A1, A2 that form a trapezoid is decided by the distance d4. In this manner, the areas surrounded by the sides b1 to b4 are the detection areas A1, A2. The detection areas A1, A2 are regular squares (rectangles) in real space rearward from the host vehicle V1, as illustrated in part (b) of FIG. 20.

Returning to FIG. 19, the viewpoint conversion unit 31 accepts input of captured image data of a predetermined area captured by the camera 10. The viewpoint conversion unit 31 converts the viewpoint of the inputted captured image data into bird's-eye view image data, which is a bird's-eye view state. A bird's-eye view state is a state of viewing from the viewpoint of an imaginary camera that is looking down from above, e.g., vertically downward (or slightly inclined downward). Viewpoint conversion can be carried out using the technique described in, e.g., Japanese Laid-Open Patent Application No. 2008-219063.

The luminance difference calculation unit 35 calculates luminance differences in the bird's-eye view image data, which has undergone viewpoint conversion by the viewpoint conversion unit 31, in order to detect the edges of a three-dimensional object included in the bird's-eye view image. The luminance difference calculation unit 35 calculates, for each of a plurality of positions along a perpendicular imaginary line extending along the perpendicular direction in real space, the luminance difference between two pixels near each position. The luminance difference calculation unit 35 is capable of calculating the luminance difference by a method for setting a single perpendicular imaginary line extending in the perpendicular direction in real space, or a method for setting two perpendicular imaginary lines.

Described below is the specific method for setting two perpendicular imaginary lines. The luminance difference calculation unit 35 sets a first perpendicular imaginary line that corresponds to a line segment extending in the perpendicular direction in real space, and a second perpendicular imaginary line that is different from the first perpendicular imaginary line and that corresponds to the line segment extending in the perpendicular direction in real space. The luminance difference calculation unit 35 determines the luminance difference between a point on the first perpendicular imaginary line and a point on the second perpendicular imaginary line in continuous fashion along the first perpendicular imaginary line and the second perpendicular imaginary line. The operation of the luminance difference calculation unit 36 is described in detail below.

Figure 21:
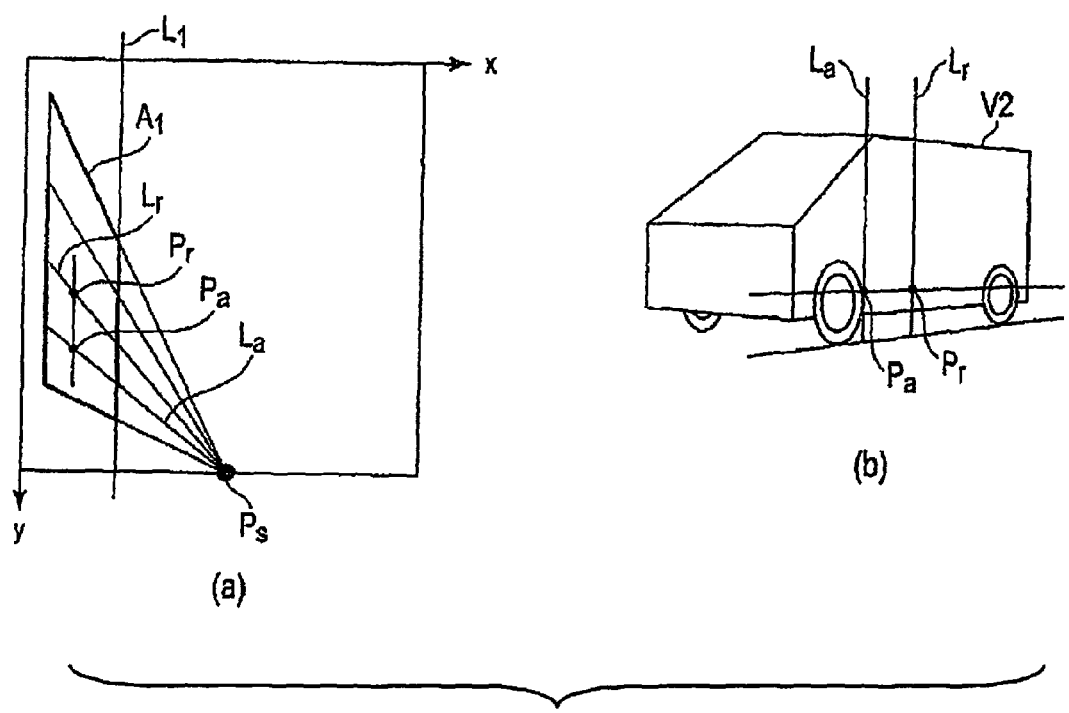
FIG. 21 is a view for describing the operation of the luminance difference calculation unit according to the second embodiment, with part (a) illustrating the positional relationship between the attention line, reference line, attention point, and reference point in a bird's-eye view image, and part (b) illustrating the positional relationship between the attention line, reference line, attention point, and reference point real space.

The luminance difference calculation unit 35 sets a first perpendicular imaginary line La (hereinbelow referred to as attention line La) that corresponds to a line segment extending in the perpendicular direction in real space and that passes through the detection area A1, as illustrated in part (a) of FIG. 21. The luminance difference calculation unit 35 sets a second perpendicular imaginary line Lr (hereinbelow referred to as reference line Lr) that is different from the attention line La, corresponds to the line segment extending in the perpendicular direction in real space, and passes through the detection area A1. Here, the reference line Lr is set to a position at a distance from the attention line La by a predetermined distance in real space. The lines that correspond to the line segments extending in the perpendicular direction in real space are lines that spread out in the radial direction from the position Ps of the camera 10 in a bird's-eye view image. These lines spreading out in the radial direction are lines that follow the collapsing direction of the three-dimensional object when converted to a bird's-eye view.

The luminance difference calculation unit 35 sets an attention point Pa on the attention line La (a point on the first perpendicular imaginary line). The luminance difference calculation unit 35 sets a reference point Pr on the reference line Lr (a point on the second perpendicular imaginary line). The attention line La, the attention point Pa, the reference line Lr, and the reference point Pr have the relationship in real space illustrated in part (b) of FIG. 21. It is apparent from part (b) of FIG. 21 that the attention line La and the reference line Lr are lines extending in the perpendicular direction in real space, and that the attention point Pa and the reference point Pr are points set to substantially the same height in real space. The attention point Pa and the reference point Pr are not necessarily required to be rigorously kept at the same height, and a certain amount of error that allows for the attention point Pa and the reference point Pr to be deemed to be at the same height is allowed.

The luminance difference calculation unit 35 determines the luminance difference between the attention point Pa and the reference point Pr. If the luminance difference between the attention point Pa and the reference point Pr is great, it is possible that an edge is present between the attention point Pa and the reference point Pr. In the second embodiment in particular, a perpendicular imaginary line is set as a line segment extending in the perpendicular direction in real space in relation to the bird's-eye view image, in order to detect a three-dimensional object present in the detection areas A1, A2. Therefore, there is a high possibility that there is an edge of a three-dimensional object in the location where the attention line La has been set when the luminance difference between the attention line La and the reference line Lr is high. Accordingly, the edge line detection unit 36 illustrated in FIG. 19 detects an edge line based on the luminance difference between the attention point Pa and the reference point Pr.

Figure 22:
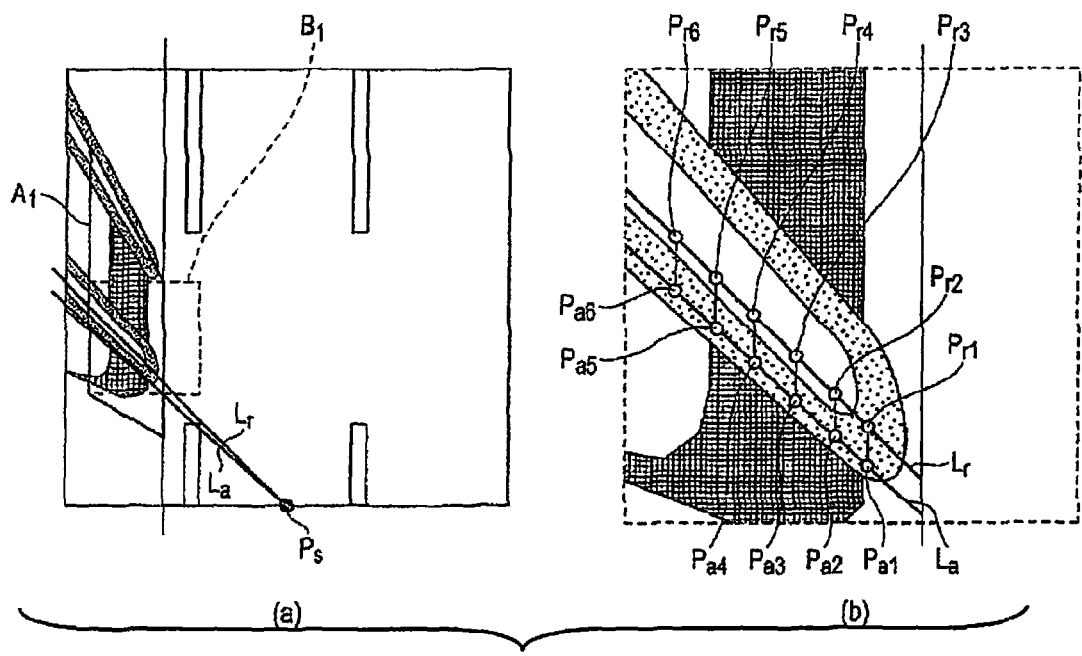
FIG. 22 is a view for describing the detailed operation of the luminance difference calculation unit according to the second embodiment, with part (a) illustrating the detection areas in the bird's-eye view image, and part (b) illustrating the positional relationship between the attention line, reference line, attention point, and reference point in the bird's-eye view image.

This point will be described in greater detail. FIG. 22 is a view for describing the detailed operation of the luminance difference calculation unit 35. Part (a) of FIG. 22 illustrates a bird's-eye view image of the bird's-eye view state, and part (b) of FIG. 22 is an enlarged view of the bird's-eye view of a portion B1 of the bird's-eye view image illustrated in part (a) of FIG. 22. In FIG. 22, only the detection area A1 is illustrated and described, but the luminance difference is calculated using the same procedure for detection area A2.

When the adjacent vehicle V2 is being displayed in the captured image captured by the camera 10, the adjacent vehicle V2 appears in the detection area A1 in the bird's-eye view image, as illustrated in part (a) of FIG. 22. The attention line La is set on a rubber portion of a tire of the adjacent vehicle V2 in the bird's-eye view image in part (b) of FIG. 22, as illustrated in the enlarged view of area B1 in part (a) of FIG. 22. In this state, first, the luminance difference calculation unit 35 sets the reference line Lr. The reference line Lr is set along the perpendicular direction in a position set at a predetermined distance in real space from the attention line La. Specifically, in the three-dimensional object detection device 1a according to the present embodiment, the reference line Lr is set in a position at a distance of 10 cm away in real space from the attention line La. The reference line Lr is thereby set on the wheel of the tire of the adjacent vehicle V2 set, e.g., at a distance that corresponds to 10 cm from the rubber of the tire of the adjacent vehicle V2 in the bird's-eye view image.

Next, the luminance difference calculation unit 35 sets a plurality of attention points Pa1 to PaN on the attention line La. In part (b) of FIG. 22, six attention points Pa1 to Pa6 (hereinbelow referred to as attention point Pai when indicating an arbitrary point) are set for convenience of description. An arbitrary number of attention points Pa may be set on the attention line La. In the description below, N attention points Pa are set on the attention line La.

The luminance difference calculation unit 35 subsequently sets the reference points Pr1 to PrN so as to have the same height as the attention points Pa1 to PaN in real space. The luminance difference calculation unit 35 calculates the luminance difference between attention point Pa and reference point Pr pairs at the same height. The luminance difference calculation unit 35 thereby calculates the luminance difference between two pixels for each of the plurality of positions (1–N) along the perpendicular imaginary line extending in the perpendicular direction in real space. The luminance difference calculation unit 35 calculates the luminance difference between, e.g., a first attention point Pa1 and a first reference point Pr1, and calculates the luminance difference between a second attention point Pa2 and a second reference point Pr2. The luminance difference calculation unit 35 thereby determines the luminance difference in continuous fashion along the attention line La and the reference line Lr. In other words, the luminance difference calculation unit 35 sequentially determines the luminance difference between the third to $N^{th}$ attention points Pa3 to PaN and the third to $N^{th}$ reference points Pr3 to PrN.

The luminance difference calculation unit 35 repeats the process of setting the above-described reference line Lr, setting the attention point Pa, setting the reference point Pr, and calculating the luminance difference while shifting the attention line La within the detection area A1. In other words, the luminance difference calculation unit 35 repeatedly executes the above-described process while changing the positions of the attention line La and the reference line Lr by the same distance in real space along the direction in which the ground line L1 extends. The luminance difference calculation unit 35, e.g., sets the line that was the reference line Lr in the previous process to be the attention line La, sets the reference line Lr in relation to the attention line La, and sequentially determines the luminance difference.

In this manner, in the second embodiment, determining the luminance difference from the attention point Pa on the attention line La and the reference point Pr on the reference line Lr, which are at substantially the same height in real space, allows the luminance difference to be distinctly detected when an edge extending in the perpendicular direction is present. The precision for detecting a three-dimensional object can be enhanced without the process for detecting the three-dimensional object being affected, even when the three-dimensional object is enlarged in accordance with the height from the road surface by conversion to a bird's-eye view image in order compare the luminance between the perpendicular imaginary lines extending in the perpendicular direction in real space.

Returning to FIG. 19, the edge line detection unit 36 detects the edge line from the continuous luminance difference calculated by the luminance difference calculation unit 35. For example, in the case illustrated in part (b) of FIG. 22, the first attention point Pa1 and the first reference point Pr1 are positioned at the same tire portion, and the luminance difference is therefore small. On the other hand, the second to sixth attention points Pa2 to Pa6 are positioned at the rubber portions of the tire, and the second to sixth reference points Pr2 to Pr6 are positioned at the wheel portion of the tire. Therefore, the luminance difference between the second to sixth attention points Pa2 to Pa6 and the second to sixth reference points Pr2 to Pr6 is great. Accordingly, the edge line detection unit 36 is capable of detecting that an edge is present between the second to sixth attention points Pa2 to Pa6 and the second to sixth reference points Pr2 to Pr6 where the luminance difference is high.

Specifically, when an edge line is to be detected, the edge line detection unit 36 first assigns an attribute to the $i^{th}$ attention point Pai from the luminance difference between the $i^{th}$ attention point Pai (coordinates (xi, yi)) to the $i^{th}$ reference point Pri (coordinates (xi', yi')) in accordance with formula 1 noted below.

$$s(xi, yi) = 1$$

when I(xi, yi)>I(xi', yi')+t $$s(xi,yi)=-1$$

when I(xi, yi)<I(xi', yi')−t $$s(xi,yi)=0 \qquad \text{Formula 1}$$

when the above do not hold true.

In formula 1 above, t represents a predetermined threshold value, I(xi, yi) represents the luminance value of the $i^{th}$ attention point Pai, and I(xi', yi') represents the luminance value of the $i^{th}$ reference point Pri. In accordance with formula 1, the attribute s(xi, yi) of the attention point Pai is '1' when the luminance value of the attention point Pai is greater than the luminance value obtained by adding the threshold value t to the reference point Pri. On the other hand, the attribute s(xi, yi) of the attention point Pai is '−1' when the luminance value of the attention point Pai is less than the luminance value obtained by subtracting the threshold value t from the reference point Pri. The attribute s(xi, yi) of the attention point Pai is '0' when the luminance value of the attention point Pai and the luminance value of the reference point Pri are in a relationship other than that stated above.

Next, the edge line detection unit 36 assesses whether the attention line La is an edge line from the continuity c(xi, yi) of the attribute s along the attention line La based on the following formula 2.

$$c(xi,yi)=1$$

when s(xi, yi)=s(xi+1, yi+1) (excluding when 0=0)

$$c(xi,yi)=0 \qquad \text{Formula 2}$$

when the above does not hold true.

The continuity c(xi, yi) is '1' when the attribute s(xi, yi) of the attention point Pai and the attribute s(xi+1, yi+1) of the adjacent attention point Pai+1 are the same. The continuity c(xi, yi) is '0' when the attribute s(xi, yi) of the attention point Pai and the attribute s(xi+1, yi+1) of the adjacent attention point Pai+1 are not the same.

Next, the edge line detection unit 36 determines the sum of the continuities c of all the attention points Pa on the attention line La. The edge line detection unit 36 divides the sum of the continuities c thus determined by the number N of attention points Pa to thereby normalize the continuity c. The edge line detection unit 36 determines the attention line La to be an edge line when the normalized value has exceeded a threshold value θ. The threshold value θ is set in advance by experimentation or other means.

In other words, the edge line detection unit 36 determines whether the attention line La is an edge line based on formula 3 noted below. The edge line detection unit 36 then determines whether all of the attention lines La drawn on the detection area A1 are edge lines.

$$\Sigma c(xi,yi)/N > \theta \qquad \text{Formula 3}$$

Figure 23:
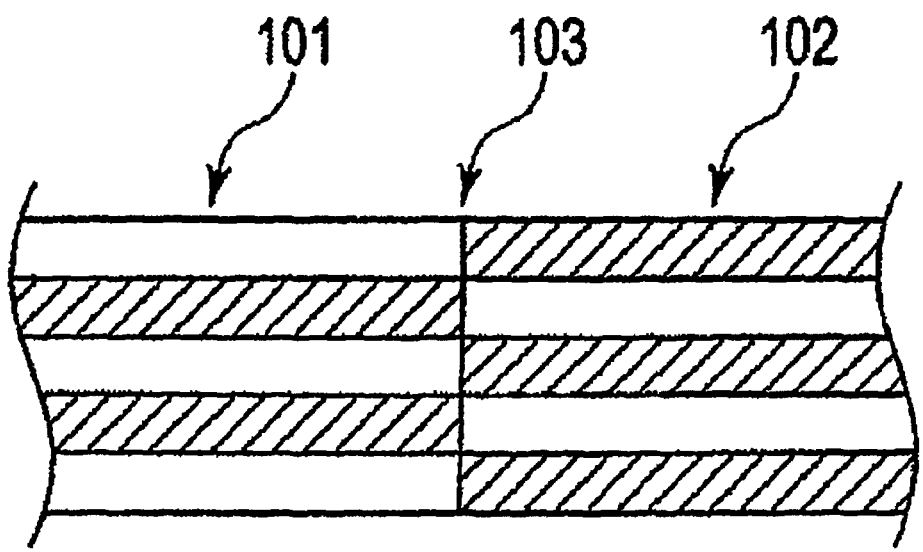
FIG. 23 is a view illustrating an image example for describing edge detection operation.

In this manner, in the second embodiment, an attribute is assigned to the attention point Pa based on the luminance difference between the attention point Pa on the attention line La and the reference point Pr on the reference line Lr, and it is determined whether the attention line La is an edge line based on the continuity c of the attributes along the attention line La. Therefore, the boundaries between areas having high luminance and areas having low luminance are detected as edge lines, and edges can be detected in accordance with the natural senses of a human. The results of the above will be described. FIG. 23 is a view illustrating an image example for describing the processing of the edge line detection unit 36. This image example is an image in which a first stripe pattern 101 and a second stripe pattern 102 are adjacent to each other, the first stripe pattern 101 indicating a stripe pattern in which areas of high luminance and areas of low luminance are repeated, and the second stripe pattern 102 indicating a stripe pattern in which areas of low luminance and areas of high luminance are repeated. Also, in this image example, areas of the first stripe pattern 101 in which the luminance is high, and areas of the second stripe pattern 102 in which the luminance is low are adjacent to each other, and areas of the first stripe pattern 101 in which the luminance is low, and areas of the second stripe pattern 102 in which the luminance is high are adjacent to each other. The location 103 positioned on the boundary between the first stripe pattern 101 and the second stripe pattern 102 tends not to be perceived as an edge by human senses.

In contrast, because the areas of low luminance and the areas of high luminance are adjacent to each other, the location 103 is recognized as an edge when an edge is detected only by luminance difference. However, the edge line detection unit 36 assesses the location 103 to be an edge line only when there is continuity in the attributes of the luminance difference. Therefore, the edge line detection unit 36 is capable of suppressing errant assessment in which the location 103, which is not recognized as an edge line by human senses, is recognized as an edge line, and edges can be detected in accordance with human senses.

Returning to FIG. 19, the three-dimensional object detection unit 33a detects a three-dimensional object based on the quantity of edge lines detected by the edge line detection unit 36. As described above, the three-dimensional object detection device 1a according to the present embodiment detects an edge line extending in the perpendicular direction in real space. Detecting many edge lines extending in the perpendicular direction indicates that there is a high possibility that a three-dimensional object is present in the detection areas A1, A2. Accordingly, the three-dimensional object detection unit 33a detects a three-dimensional object based on the quantity of edge lines detected by the edge line detection unit 36. Specifically, the three-dimensional object detection unit 33a determines whether the quantity of edge lines detected by the edge line detection unit 36 is a predetermined threshold value β or greater, and when the quantity of edge lines is a predetermined threshold value β or greater, the edge lines detected by the edge line detection unit 36 are determined to be the edge lines of a three-dimensional object, and a three-dimensional object based on edge lines is thereby detected to be an adjacent vehicle V2.

Thus, the edge waveform is one mode of distribution information of pixels that indicate a predetermined luminance difference, and the "distribution information of pixels" in the present embodiment can be positioned with information indicating the state of distribution of "pixels having a luminance difference at a predetermined threshold value or greater" as detected along the direction in which the three-dimensional object collapses when the captured image is converted in viewpoint to a bird's-eye view image. In other words, the three-dimensional object detection unit 33a detects, in the bird's-eye view image obtained by the viewpoint conversion unit 31, the distribution information of pixels in which the luminance difference is a threshold value t or higher along the direction in which the three-dimensional object collapses when conversion in viewpoint is made to a bird's-eye view image, and detects a three-dimensional object based on the distribution information of pixels (edge lines) when the degree of distribution of pixels (quantity of edge lines) in the direction in which the three-dimensional object collapses is at a predetermined threshold value β or greater.

Figure 24:
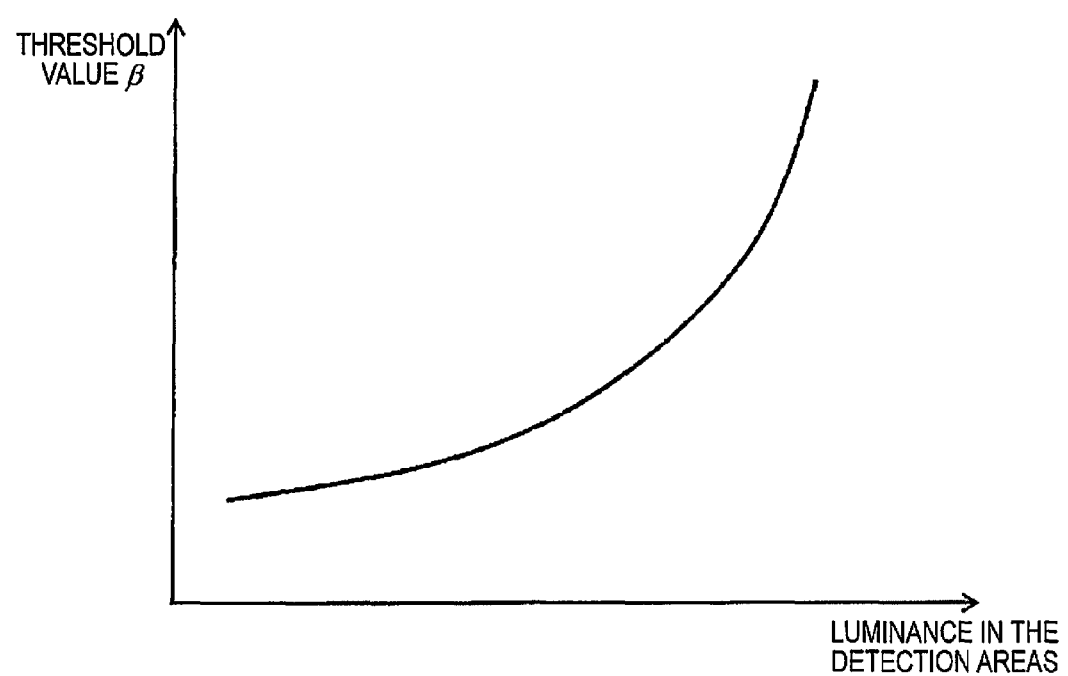
FIG. 24 is a view illustrating an example of the relationship between the luminance in the detection areas A1, A2 and the threshold value β.
Figure 25:
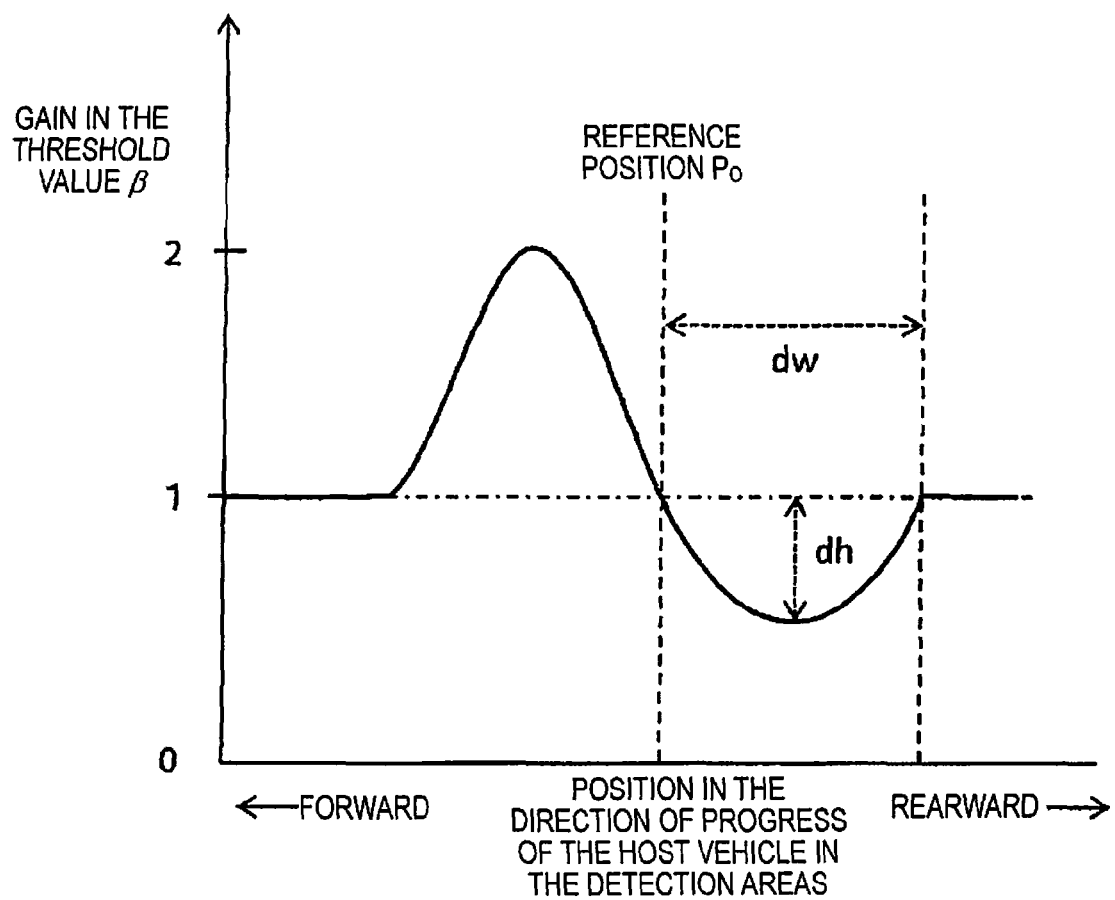
FIG. 25 is a view illustrating an example of the gain in the threshold value β set in accordance with the position of the light source.

In the second embodiment, the threshold value β for detecting an adjacent vehicle is set by the detection reference setting unit 34. In other words, in the same manner as the first embodiment, in the second embodiment, the detection reference setting unit 34a sets the threshold value β in accordance with luminance, as illustrated in FIG. 24, and furthermore modifies the gain in the threshold value β in accordance with the position of the detected light source rearward from the host vehicle, as illustrated in FIG. 25. Furthermore, in the same manner as the first embodiment, the detection reference setting unit 34 causes the position of the light source and the reference position $P_O$ illustrated in FIG. 25 to match; and adjusts the gain in the threshold value β illustrated in FIG. 25 and adjusts the range of reduction dh in the gain in the threshold value β illustrated in FIG. 25 and the range dw in which the gain in the threshold value β is reduced, in accordance with the distance L in the vehicle width direction from the center position of the camera 10 to the centroid position of the light source in the same manner as the first embodiment. The detection reference setting unit 34a then sets the threshold value β in each position in the detection areas A1, A2 in the direction of progress of the host vehicle in accordance with the luminance, as illustrated in FIG. 24, and modifies the thus-set threshold value β in accordance with the gain in the threshold value β, which has been adjusted in accordance with the position of the light source.

Furthermore, prior to detecting the three-dimensional object, the three-dimensional object detection unit 33a assesses whether the edge lines detected by the edge line detection unit 36 are correct. The three-dimensional object detection unit 33a assesses whether a change in luminance on the edge lines is a predetermined threshold value tb or greater along the edge lines of the bird's-eye view image. When the change in luminance on the edge lines in the bird's-eye view image is a predetermined threshold value tb or greater, the edge lines are determined to have been detected by errant assessment. On the other hand, when the change in luminance on the edge lines in the bird's-eye view image is less than a predetermined threshold value tb, it is assessed that the edge lines are correct. The threshold value tb is set in advance by experimentation or other means.

Figure 26:
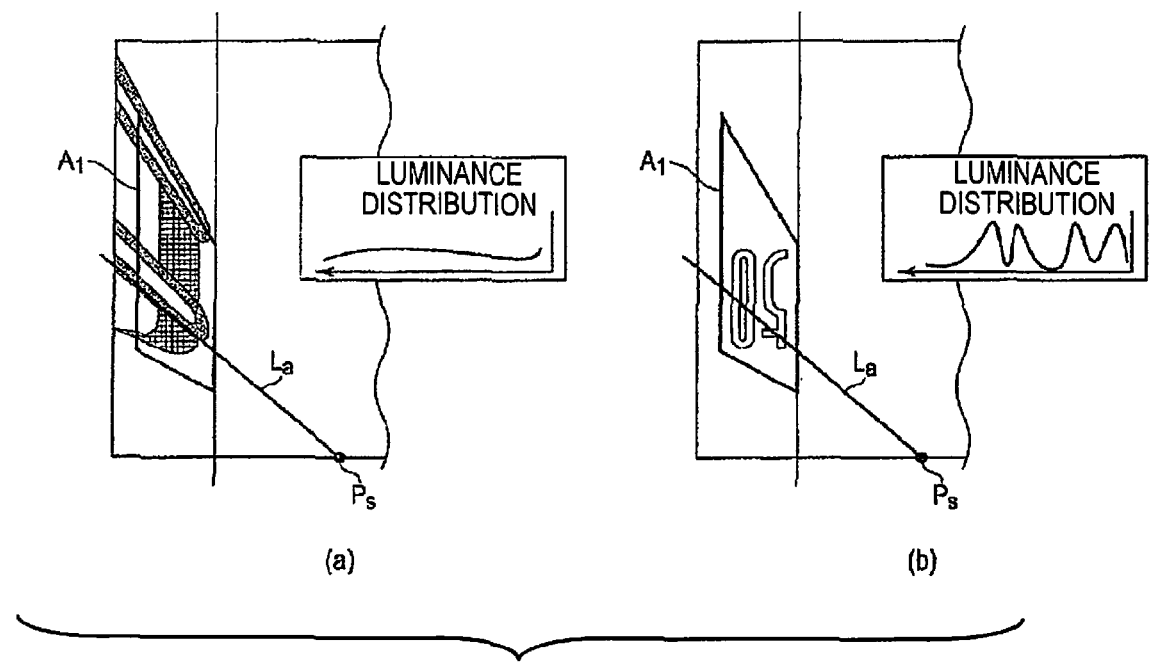
FIG. 26 is a view illustrating the edge line and the luminance distribution on the edge line, with part (a) illustrating the luminance distribution when a three-dimensional object (adjacent vehicle) is present in the detection area, and part (b) illustrating the luminance distribution when a three-dimensional object is not present in the detection area.

FIG. 26 is a view illustrating the luminance distribution of the edge line, with part (a) of FIG. 26 illustrating the edge line and the luminance distribution when an adjacent vehicle V2 as a three-dimensional object is present in the detection area A1, and part (b) of FIG. 26 illustrating the edge line and the luminance distribution when a three-dimensional object is not present in the detection area A1.

As illustrated in part (a) of FIG. 26, it is assumed that it has been determined that the attention line La set on the tire rubber portion of the adjacent vehicle V2 in on an edge line in the bird's-eye view image. In this case, the change in luminance on the attention line La in the bird's-eye view image is gradual. This is due to the image captured by the camera 10 being converted in viewpoint to a bird's-eye view image, whereby the tire of the adjacent vehicle is enlarged within the bird's-eye view image. On the other hand, the attention line La set in the white character portion "50" drawn on the road surface in the bird's-eye view image is assumed to have been errantly assessed to be an edge line, as illustrated in part (b) of FIG. 26. In this case, the change in luminance on the attention line La in the bird's-eye view image has considerable undulations. This is because the road and other portions of low luminance are mixed with the portions of high luminance in the white characters on the edge line.

The three-dimensional object detection unit 33a assesses whether an edge line has been detected by errant assessment based on differences in the luminance distribution on the attention line La as described above. The three-dimensional object detection unit 33a determines that the edge line has been detected by errant assessment when the change in luminance along the edge line is at a predetermined threshold value tb or greater, and determines that the edge line is not caused by a three-dimensional object. A reduction in precision for detecting a three-dimensional object is thereby suppressed when white characters such as "50" on the road surface, roadside vegetation, and the like are assessed to be edge lines. On the other hand, the three-dimensional object detection unit 33a determines that an edge line is the edge line of a three-dimensional object and determines that a three-dimensional object is present when changes in luminance along the edge line are less than a predetermined threshold value tb.

Specifically, the three-dimensional object detection unit 33a calculates the change in luminance of the edge line using formula 4 or 5 noted below. The change in luminance of the edge line corresponds to the evaluation value in real space in the perpendicular direction. Formula 4 evaluates the luminance distribution using the total value of the square of the difference between the $i^{th}$ luminance value I(xi, yi) and the adjacent $i^{th}$+1 luminance value I(xi+1, yi+1) on the attention line La. Formula 5 evaluates the luminance distribution using the total value of the absolute value of the difference between the $i^{th}$ luminance value I(xi, yi) and the adjacent $i^{th}$+1 luminance value I(xi+1, yi+1) on the attention line La.

Evaluation value in perpendicular equivalent
direction=Σ[{I(xi,yi)−I(xi+1,yi+1)}$^2$]   Formula 4

Evaluation value in perpendicular equivalent
direction=Σ|I(xi,yi)−I(xi+1,yi+1)|   Formula 5

No limitation is imposed in the use of formula 5, and it is also possible to binarize an attribute b of an adjacent luminance value using a threshold value t2, and then sum the binarized attribute b for all of the attention points Pa, as in formula 7 noted below.

Evaluation value in perpendicular equivalent
direction=Σb(xi,yi)   Formula 6 where b(xi, yi)=1 when |I(xi, yi)−I(xi+1, yi+1)|>t2
and b(xi, yi)=0
when the above does not hold true.

The attribute b(xi, yi) of the attention point Pa(xi, yi) is '1' when the absolute value of the luminance difference between the luminance value of the attention point Pai and the luminance value of the reference point Pri is greater than a threshold value t2. When the above relationship does not hold true, the attribute b(xi, yi) of the attention point Pai is '0.' The threshold value t2 is set in advance by experimentation or other means so that the attention line La is not assessed to be on the same three-dimensional object. The three-dimensional object detection unit 33a then sums the attribute b for all of the attention points Pa on the attention line La and determines the evaluation value in the perpendicular equivalent direction to thereby assess whether an edge line is caused by a three-dimensional object and that a three-dimensional object is present.

Figure 27:
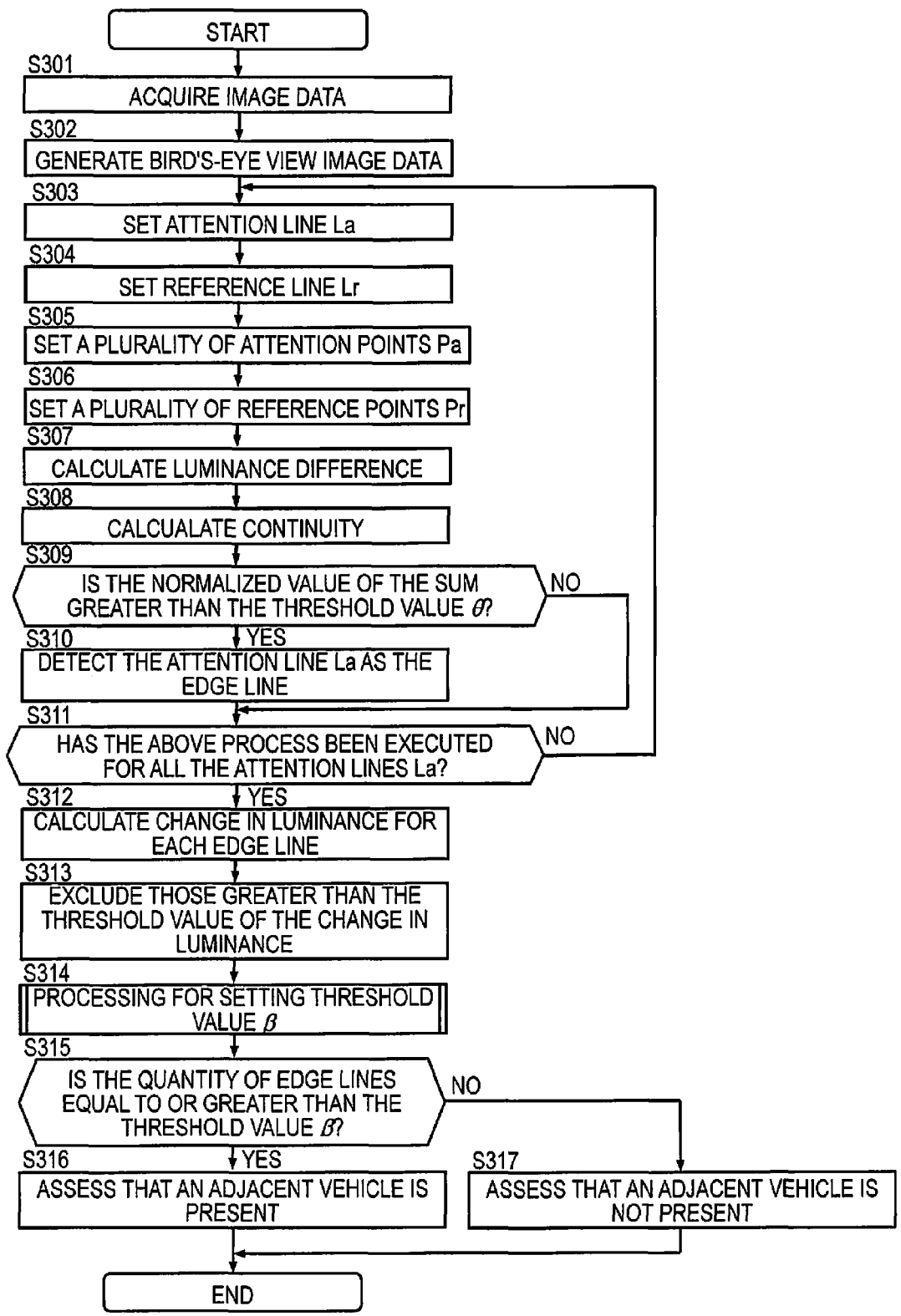
FIG. 27 is a flowchart illustrating the method for detecting an adjacent vehicle according to the second embodiment.

Next, the method for detecting an adjacent vehicle according to the second embodiment will be described. FIG. 27 is a flowchart illustrating the details of the method for detecting an adjacent vehicle according to the present embodiment. In FIG. 27, the process involved with detection area A1 will be described for the sake of convenience, but the same process is executed for the detection area A2 as well.

First, in step S301, a predetermined area specified by the view angle a and the attachment position is captured by the camera 10, and the image data of the captured image P captured by the camera 10 is acquired by the computer 30a. Next, the viewpoint conversion unit 31 converts the viewpoint of the acquired image data and generates bird's-eye view image data in step S302.

Next, in step S303, the luminance difference calculation unit 35 sets the attention line La on the detection area A1. At this time, the luminance difference calculation unit 35 sets a line corresponding to a line extending in the perpendicular direction in real space as the attention line La. In step S304, the luminance difference calculation unit 35 subsequently sets the reference line Lr on the detection area A1. At this point, the luminance difference calculation unit 35 sets, as the reference line Lr, a line that corresponds to a line extending in the perpendicular direction in real space, the line also being separated by a predetermined distance in real space from the attention line La.

Next, in step S305, the luminance difference calculation unit 35 sets a plurality of attention points on the attention line La. Also, at this time, the luminance difference calculation unit 35 sets a certain number of attention points Pa that will not be problematic during edge detection by the edge line detection unit 36. Also, in step S306 the luminance difference calculation unit 35 sets reference points Pr so that the attention points Pa and the reference points Pr are at substantially the same height in real space. The attention points Pa and the reference points Pr thereby line up in substantially the horizontal direction, and the edge line extending in the perpendicular direction in real space is more readily detected.

Next, in step S307, the luminance difference calculation unit 35 calculates the luminance difference between the attention points Pa and the reference points Pr at the same height in real space. The edge line detection unit 36 then calculates the attribute s of the attention points Pa in accordance with formula 1 described above. In step S308, the edge line detection unit 36 then calculates the continuity c of the attribute s of the attention points Pa in accordance with formula 2 noted above. In step S309, the edge line detection unit 36 furthermore assesses whether a value obtained by normalizing the sum of the continuity c is greater than a threshold value G in accordance with formula 3. When it has been determined that the normalized value is greater than the threshold value θ (step S309=Yes), the edge line detection unit 36 detects the attention line La as the edge line in step S310. The process then proceeds to step S311. When it has been determined that the normalized value is not greater than the threshold value θ (step S309=No), the edge line detection unit 36 does not detect that the attention line La is an edge line, and the process proceeds to step S311.

In step S311, the computer 30a determines whether the processes of steps S303 to S310 have been executed for all the attention lines La that can be set on the detection area A1. When it has been determined that the above processes have not been carried out for all the attention lines La (step S311=No), the process returns to step S303, sets a new attention line La, and repeats the process through step S311. On the other hand, when it has been determined that the processes have been carried out for all the attention lines La (step S311=Yes), the process proceeds to step S312.

In step S312, the three-dimensional object detection unit 33a calculates the change in luminance along the edge line for each edge line detected in step S310. The three-dimensional object detection unit 33a calculates the change in luminance of edge lines in accordance with any of formulas 4, 5, and 6. Next, in step S313, the three-dimensional dimensional object detection unit 33a excludes, from among the edge lines, edge lines in which the change in luminance is at a predetermined threshold value tb or greater. In other words, when an edge line having a large change in luminance is not assessed to be a correct edge line, the edge line is not used for detecting a three-dimensional object. As described above, this is done in order to suppress the detection of characters on the road surface, roadside vegetation, and the like included in the detection area A1 as edge lines. Therefore, the predetermined threshold value tb is determined by experimentation or other means in advance, and is set based on the change in luminance that occurs due to characters on the road surface, roadside vegetation, and the like. On the other hand, the three-dimensional object detection unit 33a determines an edge line having a change in luminance that is less than a predetermined threshold value tb to be an edge line of a three-dimensional object, and thereby detects the three-dimensional object present in an adjacent lane.

Next, in step S314, the detection reference setting unit 34a sets the threshold value β for assessing whether the three-dimensional object detected in step S310 is an adjacent vehicle. Specifically, in step S314, the detection reference setting unit 34a sets the threshold value β to a value that allows a three-dimensional object to be assessed as a four-wheeled vehicle that appears in the detection areas A1, A2 based on the number of edge lines, as illustrated in FIG. 24, and modifies the thus-set threshold value β in accordance with the gain in the threshold value β set in accordance with the position of the light source, as illustrated in FIG. 25, in the same manner as step S105 of the first embodiment. In this case, the detection reference setting unit 34a causes the position of the detected light source and the reference position $P_O$ of the control map illustrated in FIG. 25 to correspond in the same manner as the first embodiment, adjusts the control map illustrated in FIG. 25, and adjusts the control map illustrated in FIG. 25 in accordance with the distance L in the vehicle width direction from the center position of the camera 10 to the centroid position of the light source.

Next, in step S315, it is determined by the three-dimensional object assessment unit 33a whether the quantity of edge lines is a threshold value β or higher as set in step S314. When is has been assessed that the quantity of edge lines is at a threshold value β or higher (step S315=Yes), the three-dimensional object assessment unit 33a assesses in step S316 that an adjacent vehicle is present in the detection area A1. On the other hand, when the quantity of edge lines assessed to not be at the threshold value β or greater (step S315=No), the three-dimensional object detection unit 33a assesses that an adjacent vehicle is not present in the detection area A1 in step S317. The process illustrated in FIG. 27 then ends.

As described above, in the second embodiment, a captured image is converted to a bird's-eye view image, and edge information of a three-dimensional object is detected from the converted bird's-eye view image. It is determined whether the quantity of detected edge lines is at a threshold value β or higher set in accordance with the positional relationship between the camera 10 and the light source, and when the quantity of edge lines is at the threshold value β or higher, it is determined that a three-dimensional object is present in the adjacent lane, whereby a three-dimensional object present in the adjacent lane can be suitably detected. In addition to the effects of the first embodiment, in the second embodiment, it is possible to effectively prevent errant detection of an adjacent vehicle due to soil on the lens, or reflected light or the like produced when the light of headlights of an adjacent-adjacent vehicle have reflected from the road surface; and a tire/wheel of an adjacent vehicle, which is a characteristic portion of an adjacent vehicle present rearward from the headlights (light source), can be suitably detected, and an adjacent vehicle can be suitably detected. Furthermore, in accordance with the present embodiment, when the distance L in the vehicle width direction in the center position of the camera 10 to the centroid position of the light source is great and the possibility of the detected light source being the headlights of an adjacent-adjacent vehicle is high in detecting an adjacent vehicle based on edge information, the threshold value β in the area rearward from the light source is set higher in comparison with when the distance L long in the vehicle width direction from the center position of the camera 10 to the centroid position of the light source, whereby the effect of the headlights (light source) of an adjacent-adjacent vehicle can be suitably eliminated, and errant detection of an adjacent vehicle can be effectively prevented.

The embodiments described above are described in order to facilitate understanding of the present invention, and are not described in order to limit the present invention. Therefore, the elements disclosed in the embodiments above are intended to include all design modifications and equivalents thereto that lie within the technical range of the present invention.

In the first embodiment described above, an example was given in which the absolute value of the difference in the pixel values of the bird's-eye view images $PB_t$ and $PB_{t-1}$ is taken and when the absolute value is equal to or greater than a predetermined threshold value th, the pixel values of the difference image $PD_t$ are set to "1," and when the absolute value is less than a predetermined threshold value th, the pixel values of the difference image $PD_t$ are set to "0," but the threshold value th may be modified in accordance with the positional relationship between the camera 10 and the light source.

Specifically, it is also possible to use a configuration in which, the detection reference setting unit 34 increases the gain of the threshold value th in the area Rr rearward from the light source in the detection areas A1, A2 more than in the area Rf forward from the light source, as illustrated in the drawing on the right in part (A) of FIG. 9. Since the threshold value th is set to a low value with respect to the luminance in the area Rr rearward from the light source, the tire/wheel of an adjacent vehicle present rearward from the light source is becomes more readily detected in terms of the difference waveform $DW_t$, and as a result, an adjacent vehicle can be more suitably detected. In addition to this configuration, it is furthermore possible to use a configuration in which the threshold value th is modified in accordance with the luminance in the detection positions in the detection areas A1, A2.

In this case, it is also possible use a configuration in which the gain in the threshold value th is modified in accordance with the distance L in the vehicle width direction from the camera 10 to the light source. In other words, it is possible to use a configuration in which the gain in the threshold value th is increased rearward from the light source in comparison with when the distance L in the vehicle width direction from the camera 10 to the light source is short, in the case that the distance L in the vehicle width direction from the camera 10 to the light source is great and the possibility of the detected light source being the headlights of an adjacent-adjacent vehicle is high. The light of headlights of an adjacent-adjacent vehicle thereby becomes difficult to detect in terms of the difference waveform $DW_t$ and errant detection of an adjacent vehicle can be more effectively prevented even rearward from the light source when the possibility of the detected light source being the headlights of an adjacent-adjacent vehicle is high.

Furthermore, an example of a configuration was given in the first embodiment described above in which the pixel values of the difference image $PD_t$ are detected as '0' and '1' by the alignment unit 32, and the pixels having a pixel value of '1' in the difference image $PD_t$ are counted as difference pixels DP by the three-dimensional object detection unit 33 based on the difference image $PD_t$, to thereby detect an three-dimensional object, but no limitation is imposed thereby, and it is also possible to use a configuration in which, e.g., the pixel values of the difference image $PD_t$ are detected by the alignment unit 32 using the absolute values of the difference values of the bird's-eye view images $PB_t$, $PB_{t-1}$, and the pixels that exceed a predetermined difference threshold value are counted as the difference pixels DP by the three-dimensional object detection unit 33.

An example of a configuration was given in the first embodiment described above in which a captured image of the current moment and an image at a single moment prior are converted to bird's-eye views, the converted bird's-eye views are aligned, a difference image $PD_t$ is then generated, and the generated difference image $PD_t$ is evaluated along the collapsing direction (the direction in which the three-dimensional object collapses when a captured image is converted to a bird's-eye view) to generate a difference waveform $DW_t$, but no limitation is imposed thereby. For example, it is also possible to use a configuration in which only the image at a single moment prior is converted to a bird's-eye view, the converted bird's-eye view is aligned, then converted again to a captured image equivalent, a difference image $PD_t$ is generated using this image and the image at the current moment, and the generated difference image $PD_t$ is evaluated along the direction corresponding to the collapsing direction (i.e., the direction obtained by converting the collapsing direction to a direction in the captured image) to thereby generate the difference waveform $DW_t$. In other words, a bird's-eye view is not expressly required to be generated as a necessity as long as the image at the current moment and the image at a single moment prior are aligned, a difference image $PD_t$ is generated from the difference between the two aligned images, and the difference image $PD_t$ can be evaluated along the collapsing direction of a three-dimensional object when the difference image $PD_t$ is converted to a bird's-eye view.

In the first embodiment described above, the speed of the host vehicle V1 is determined based on a signal from the speed sensor 20, but no limitation is imposed thereby, and it is also possible to use a configuration in which the speed is estimated from a plurality of images at different moments. In this case, the speed sensor 20 is not required and the configuration can be simplified.

An example of a configuration was given in the second embodiment described above in which the attribute s(xi, yi) of the attention point Pai is set to '1' or '−1' when the luminance value of the attention point Pai and reference point Pri is a threshold value t or greater, and an attention line La in which the attribute s(xi, yi) of the attention point Pai and the attribute s(xi+1, yi+1) of the adjacent attention point Pai+1 are '1' or '−1' in consecutive fashion for a predetermined threshold value θ or greater is detected as an edge line, but in addition to this configuration, it is also possible to modify the threshold value t and the threshold value θ in accordance with the position of the detected light source.

Specifically, it is possible to use a configuration in which the detection reference setting unit 34a increases the gain of the threshold value t and threshold value θ in the area Rr rearward from the light source more than in the area Rf forward from the light source in the detection areas A1, A2, as illustrated in, e.g., part (A) of FIG. 9. The tire/wheel of an adjacent vehicle present rearward from a light source is thereby more readily detected as an edge line because the threshold value t and threshold value θ are set to low values with respect to the luminance in the area Rr rearward from the light source, and as a result, an adjacent vehicle can be suitably detected. In addition to this configuration, it is furthermore possible to modify the threshold value t and the threshold value α in accordance with the luminance in the detection positions in the detection areas A1, A2.

In this case, it is also possible use a configuration in which the gain in the threshold value t and the threshold value α is modified in accordance with the distance L in the vehicle width direction from the camera 10 to the light source. In other words, it is possible to use a configuration in which the gain in the threshold value t and the threshold value α is increased rearward from the light source in comparison with when the distance L in the vehicle width direction from the camera 10 to the light source is short, in the case that the distance L in the vehicle width direction from the camera 10 to the light source is great and the possibility of the detected light source being the headlights of an adjacent-adjacent vehicle is high. The light of headlights of an adjacent-adjacent vehicle thereby becomes difficult to detect as edge lines and errant detection of an adjacent vehicle can be more effectively prevented even rearward from the light source when the possibility of the detected light source being the headlights of an adjacent-adjacent vehicle is high.

Additionally, an example of a configuration was given in the second embodiment described above in which the change in luminance of the edge lines is calculated in accordance with any of formulas 4, 5, and 6, and among the edge lines, the edge lines in which the change in luminance is at a threshold value tb or higher are excluded, but in addition to this configuration, the threshold value tb may be modified in accordance with the position of the detected light source.

Specifically, it is possible to use a configuration in which the detection reference setting unit 34a increases the gain of the threshold value tb in the area Rr rearward from the light source more than in the area Rf forward from the light source in the detection areas A1, A2, as illustrated in part (A) of FIG. 10. The edge lines of a tire/wheel of an adjacent vehicle present rearward from a light source can thereby be more accurately detected because the threshold value tb are set to low values with respect to the luminance in the area Rr rearward from the light source. In addition to this configuration, it is furthermore possible to modify the threshold value tb in accordance with the luminance in the detection positions in the detection areas A1, A2.

In this case, it is also possible use a configuration in which the gain in the threshold value tb is modified in accordance with the distance L in the vehicle width direction from the camera 10 to the light source. In other words, it is possible to use a configuration in which the gain in the threshold value tb is increased rearward from the light source in comparison with when the distance L in the vehicle width direction from the camera 10 to the light source is short, in the case that the distance L in the vehicle width direction from the camera 10 to the light source is great and the possibility of the detected light source being the headlights of an adjacent-adjacent vehicle is high. The light of headlights of an adjacent-adjacent vehicle thereby becomes difficult to detect as edge lines and errant detection of an adjacent vehicle can be more effectively prevented even rearward from the light source when the possibility of the detected light source being the headlights of an adjacent-adjacent vehicle is high.

Furthermore, an example of a configuration was given in the embodiments described above in which the threshold value α or other detection reference is set to a low value so that a three-dimensional object is readily detected in the area Rr rearward from the headlights (light source), but no limitation is imposed by this configuration, and it is also possible to use a configuration in which the detection reference is set to a high value so that a three-dimensional object is readily detected in the area Rr rearward from the headlights (light source) when a three-dimensional object is to be readily detected in commensurate fashion to a higher detection reference.

The camera 10 in the embodiments described above corresponds to the image capturing means of the present invention. The viewpoint conversion unit 31 corresponds to the image conversion means of the present invention, and the alignment unit 32, the three-dimensional object detection unit 33, 33a, the detection reference setting unit 34, 34a, the luminance difference calculation unit 35, and the edge line detection unit 36 correspond to the three-dimensional object detection means, and the detection reference setting unit 34, 34a corresponds to the distance calculation means of the present invention.

The invention claimed is:

1. A three-dimensional object detection device comprising:
   an image capturing unit arranged to capture images of a predetermined area relative to an adjacent lane rearward of a host vehicle equipped with the three-dimensional object detection device; and
   a computer programmed to include:
   an image conversion unit programmed to convert a viewpoint of the images obtained by the image capturing unit to create bird's-eye view images;
   a three-dimensional object detection unit programmed to:
      align, in a bird's-eye view, positions of the bird's-eye view images obtained at different times by the image conversion unit,
      obtain a difference between the bird's-eye view images to generate a difference image,
      generate difference waveform information by counting a number of pixels that indicate a difference having a predetermined first threshold value or higher in a difference image of the aligned bird's-eye view images to form a frequency distribution, wherein the pixels are counted along lines in a direction in which a three dimensional object collapses due to viewpoint conversion and values of the difference waveform information correspond to the lines in the difference image, and
      detect a presence of a three-dimensional object within the adjacent lane based on the difference waveform information when the difference waveform information is at a predetermined second threshold value or higher; and a light source detection unit programmed to detect a light source present rearward of the host vehicle based on the images obtained by the image capturing unit, the three-dimensional object detection unit setting at least one of the first and second threshold values lower in a rearward area of the predetermined area further rearward from the light source than a line connecting the light source and the image capturing unit as detected by the light source detection unit than in a forward area of the predetermined area further forward from the light source than the line.

2. The three-dimensional object detection device according to claim 1, wherein:

the computer further programmed to include a distance calculation unit programmed to calculate a distance in a vehicle width direction from the image capturing unit to the light source, the three-dimensional object detection unit setting at least one of the first and second threshold values higher so that as a distance in the vehicle width direction from the image capturing unit to the light source increases, the at least one of the first and second threshold values increases.

3. A three-dimensional object detection device comprising:

an image capturing unit arranged to capture images of a predetermined area relative to an adjacent lane rearward of a host vehicle equipped with the three-dimensional object detection device; and a computer programmed to include:

an image conversion unit programmed to convert a viewpoint of the images obtained by the image capturing unit to create bird's-eye view images;

a three-dimensional object detection unit programmed to:

detect edge information having a predetermined first threshold value or higher from the bird's-eye view images, and detect a presence of a three-dimensional object within the adjacent lane based on the edge information when the edge information is at a predetermined second threshold value or higher; and a light source detection unit programmed to detect a light source present rearward of the host vehicle based on the images obtained by the image capturing unit, the three-dimensional object detection unit setting at least one of the first and second threshold values lower in a rearward area of the predetermined area further rearward from the light source than a line connecting the light source and the image capturing unit as detected by the light source detection unit than a forward area of the predetermined area further forward from the light source than the line.

4. The three-dimensional object detection device according to claim 3, wherein:

the computer further programmed to include a distance calculation unit programmed to calculate a distance in a vehicle width direction from the image capturing unit to the light source, the three-dimensional object detection unit setting at least one of the first and second threshold values higher so that as a distance in the vehicle width direction from the image capturing unit to the light source increases, the at least one of the first and second threshold values increases.

5. A three-dimensional object detection device comprising:

an image capturing unit arranged to capture an image of a predetermined area relative to an adjacent lane rearward of a host vehicle equipped with the three-dimensional object detection device; and a computer programmed to include:

an image conversion unit programmed to convert a viewpoint of the image obtained by the image capturing unit to create a bird's-eye view image;

a three-dimensional object detection unit programmed to detect a presence of a three-dimensional object within the adjacent lane based on distribution information of pixels in the bird's-eye view image obtained by the image conversion unit in which a luminance difference is at a predetermined first threshold value or greater along a direction in which the three-dimensional object collapses when converted in viewpoint to the bird's-eye view image, and the three-dimensional object detection unit determining the presence of the three-dimensional object when an amount of distribution of the pixels in the direction in which the three-dimensional object collapses is at a predetermined second threshold value or greater; and a light source detection unit programmed to detect a light source present rearward of the host vehicle based on the image obtained by the image capturing unit, the three-dimensional object detection unit specifying, as an area to be detected, an area in which a possibility of another vehicle traveling in an adjacent lane being present in the predetermined area is at a predetermined value or higher based on a detection position of the light source detected by the light source detection unit, and setting the first threshold value or the second threshold value lower in the area to be detected.

* * * * *